United States Patent
Asoh et al.

(10) Patent No.: US 6,371,377 B2
(45) Date of Patent: *Apr. 16, 2002

(54) CARD TYPE RECORDING MEDIUM AND ACCESS CONTROL METHOD FOR CARD TYPE RECORDING MEDIUM AND COMPUTER-READABLE RECORDING MEDIUM HAVING ACCESS CONTROL PROGRAM FOR CARD TYPE RECORDING MEDIUM RECORDED

(75) Inventors: Izumi Asoh, Kawasaki; Shuichi Tsubura, Maebashi, both of (JP)

(73) Assignee: Fujitsu Limited, Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,682

(22) Filed: Jun. 16, 1998

(30) Foreign Application Priority Data

Dec. 10, 1997 (JP) ............................................. 9-340382

(51) Int. Cl.[7] ............................................. G06K 19/00
(52) U.S. Cl. ........................................ 235/487; 235/382
(58) Field of Search ............................... 235/487, 492, 235/380, 379, 472; 902/2

(56) References Cited

U.S. PATENT DOCUMENTS

| | | | |
|---|---|---|---|
| 4,614,861 A | * 9/1986 | Pavlov et al. | 235/380 |
| 4,853,522 A | 8/1989 | Ogasawara | 235/380 |
| 4,882,474 A | 11/1989 | Anderl et al. | 235/380 |
| 5,097,115 A | * 3/1992 | Ogasawara et al. | 235/380 |
| 5,221,838 A | * 6/1993 | Gutman et al. | 235/379 |
| 5,293,424 A | * 3/1994 | Hotley et al. | 380/23 |
| 5,488,718 A | * 1/1996 | Tanaka et al. | 395/600 |
| 5,506,395 A | * 4/1996 | Eppley | 235/486 |
| 5,630,115 A | * 5/1997 | Mikamo | 395/621 |
| 5,949,058 A | * 9/1999 | Kimura | 235/486 |

FOREIGN PATENT DOCUMENTS

| | | |
|---|---|---|
| JP | 60-160491 | 8/1985 |
| JP | 60-205688 | 10/1985 |
| JP | 60-205689 | 10/1985 |
| JP | 60-205690 | 10/1985 |
| JP | 60-207939 | 10/1985 |
| JP | 62-210556 | 9/1987 |
| JP | 63-37446 | 2/1988 |
| JP | 64-76396 | 3/1989 |
| JP | 1-126791 | 5/1989 |
| JP | 5-250765 | 9/1993 |
| JP | 6-4480 | 1/1994 |

* cited by examiner

*Primary Examiner*—Karl Frech
(74) *Attorney, Agent, or Firm*—Arent Fox Kintner Plotkin Kahn PLLC

(57) ABSTRACT

The present invention provides a card type recording medium such as an IC card, which contains storage units to store data and an access control unit to control an access to the data by an access subject. The access control unit is designed to include an access subject identification information generating unit to generate an access subject identification information for identifying the access subject, an access authority information read-in unit to read in access authority information set in correspondence with the data that the access subject requests to access, and a control unit to obtain an access authority from the access subject identification information and the access authority information, and to control an access to the data by the access subject on the basis of the access authority obtained. Thereby, the card type recording medium intends to simplify the setting and modifying work of an access authority, and to reliably perform the management and operation of a security system.

13 Claims, 40 Drawing Sheets

FIG. 7

AUDIT LOG FILE ( IEF )

| RECORD No. | RECORD |
|---|---|
| 1 | COMMAND RECEIVE ( 1 ST TIME ) |
| 2 | COMMAND RESULT ( 1 ST TIME ) |
| 3 | COMMAND RECEIVE ( 2 ND TIME ) |
| 4 | COMMAND RESULT ( 2 ND TIME ) |
| 5 | COMMAND RECEIVE ( 3 RD TIME ) |
| . | |
| n | COMMAND RESULT ( m TH TIME ) |

DETAILED CONTENT OF COMMAND RECEIVE LOG
   FOLLOWING INFORMATION ARE STORED IN RECEIVE LOG.
     — RECEIVE COUNT NUMBER ( COUNT AT EACH COMMAND RECEPTION IN
                     CARD OS )
     — RECEIVE COMMAND
     — AUTHENTICATING CLEARANCE INFORMATION BEFORE RECEIVE
       ( AUTHENTICATING CLEARANCE INFORMATION BEFORE COMMAND
        PROCESSED )
     — COLLATING CLEARANCE INFORMATION BEFORE RECEIVE
       ( COLLATING CLEARANCE INFORMATION BEFORE COMMAND PROCESSED )

DETAILED CONTENT OF COMMAND RECEIVE LOG
   FOLLOWING INFORMATION ARE STORED IN RECEIVE LOG.
     — RECEIVE COUNT NUMBER
       ( COUNT AT EACH COMMAND RECEPTION IN CARD OS )
     — RESPONSE INFORMATION AFTER PROCESSED
     — AUTHENTICATING CLEARANCE INFORMATION AFTER PROCESSED
       ( AUTHENTICATING CLEARANCE INFORMATION AFTER COMMAND
        PROCESSED )
     — COLLATING CLEARANCE INFORMATION AFTER PROCESSED
       ( COLLATING CLEARANCE INFORMATION AFTER COMMAND PROCESSED )

FIG.9(a)

POSSESS CLEARANCE FOR ACCOUNTING DEPARTMENT MANAGER
AND ACCOUNTING SECTION MANAGER

| CLEARANCE INFORMATION | | CATEGORY | | | | |
|---|---|---|---|---|---|---|
| | | PERSONNEL | ACCOUNTING | GENERAL AFFAIRS | DEVELOPMENT | PURCHASE |
| LEVEL | DEPARTMENT MANAGER | | ○ | | | |
| | DEPARTMENT MANAGER IN CHARGE | | | | | |
| | SECTION MANAGER | | ○ | | | |
| | GENERAL-DUTIES GRADE | | | | | |

FIG.9(b)

NEWLY OBTAIN CLEARANCE FOR DEPARTMENT MANAGER
IN CHARGE OF GENERAL AFFAIRS

| CLEARANCE INFORMATION | | CATEGORY | | | | |
|---|---|---|---|---|---|---|
| | | PERSONNEL | ACCOUNTING | GENERAL AFFAIRS | DEVELOPMENT | PURCHASE |
| LEVEL | DEPARTMENT MANAGER | | | | | |
| | DEPARTMENT MANAGER IN CHARGE | | | ○ | | |
| | SECTION MANAGER | | | | | |
| | GENERAL-DUTIES GRADE | | | | | |

FIG.9(c)

WHEN ARITHMETIC FUNCTION OF CLEARANCE IS DEFINED
AS LOGICAL SUM WITH PRIOR INFORMATION

| CLEARANCE INFORMATION | | CATEGORY | | | | |
|---|---|---|---|---|---|---|
| | | PERSONNEL | ACCOUNTING | GENERAL AFFAIRS | DEVELOPMENT | PURCHASE |
| LEVEL | DEPARTMENT MANAGER | | ○ | | | |
| | DEPARTMENT MANAGER IN CHARGE | | | ○ | | |
| | SECTION MANAGER | | ○ | | | |
| | GENERAL-DUTIES GRADE | | | | | |

FIG. 10(a)

COLLATING CLEARANCE INFORMATION

| COLLATING CLEARANCE INFORMATION | | CATEGORY | | | | |
|---|---|---|---|---|---|---|
| | | PERSONNEL | ACCOUNTING | GENERAL AFFAIRS | DEVELOPMENT | PURCHASE |
| LEVEL | DEPARTMENT MANAGER | | ○ | | | |
| | DEPARTMENT MANAGER IN CHARGE | | | ○ | | |
| | SECTION MANAGER | | ○ | | | |
| | GENERAL-DUTIES GRADE | | | | | |

FIG. 10(b)

AUTHENTICATING CLEARANCE INFORMATION

| AUTHENTICATING CLEARANCE INFOMATION | | CATEGORY | | | | |
|---|---|---|---|---|---|---|
| | | PERSONNEL | ACCOUNTING | GENERAL AFFAIRS | DEVELOPMENT | PURCHASE |
| LEVEL | DEPARTMENT MANAGER | | | | | |
| | DEPARTMENT MANAGER IN CHARGE | | | ○ | | ○ |
| | SECTION MANAGER | | ○ | | | |
| | GENERAL-DUTIES GRADE | | | | | |

FIG. 10(c)

COLLATING / AUTHENTICATING CLEARANCE INFORMATION

| COLLATING/ AUTHENTICATING CLEARANCE INFORMATION | | CATEGORY | | | | |
|---|---|---|---|---|---|---|
| | | PERSONNEL | ACCOUNTING | GENERAL AFFAIRS | DEVELOPMENT | PURCHASE |
| LEVEL | DEPARTMENT MENAGER | | ○ − | | | |
| | DEPARTMENT MANAGER IN CHARGE | | | ○ ○ | | − ○ |
| | SECTION MANAGER | | ○ ○ | | | |
| | GENERAL-DUTIES GRADE | | | | | |

FIG. 11

ACCESS AUTHORITY INFORMATION

| $F_O$ : COMBINED LOGICAL FUNCTION | | | | | | |
|---|---|---|---|---|---|---|
| AUTHENTICATING CLEARANCE INFORMATION | | CATEGORY | | | | |
| | | PERSONNEL | ACCOUNTING | GENERAL AFFAIRS | DEVELOPMENT | PURCHASE |
| LEVEL | DEPARTMENT MANAGER | fo 11 | fo 12 | fo 13 | fo 14 | fo 15 |
| | DEPARTMENT MANAGER IN CHARGE | fo 21 | fo 22 | fo 23 | fo 24 | fo 25 |
| | SECTION MANAGER | fo 31 | fo 32 | fo 33 | fo 34 | fo 35 |
| | GENERAL-DUTIES GRADE | fo 41 | fo 42 | fo 43 | fo 44 | fo 45 |

```
fo12: COLLATING   AUTHENTICATING   ACCESS AUTHORITY
         O              O              = RWX
         O              —              = RW−
         —              O              = RW−
         —              —              = --- fo23: COLLATING   AUTHENTICATING   ACCESS AUTHORITY
         O              O              = RW−
         O              —              = R--
         —              O              = R--
         —              —              = --- fo25: COLLATING   AUTHENTICATING   ACCESS AUTHORITY
         O              O              = ---
         O              —              = ---
         —              O              = ---
         —              —              = --- fo32: COLLATING   AUTHENTICATING   ACCESS AUTHORITY
         O              O              = RWX
         O              —              = R−X
         —              O              = R−X
         —              —              = ---
```
} Q

ACCESS AUTHORITY OBTAINED ON THE ASSUMPTION THAT $F_O = ( fo12$ OR $fo23 )$ AND $( fo32 )$ --- (1) IS GIVEN IS $F_O = ( RW−$ OR $RW− )$ AND $( RWX ) = RW−$

FIG. 12

| CLEARANCE INFORMATION | CATEGORY | | |
|---|---|---|---|
| | PERSONNEL | ACCOUNTING | OTHERS |
| LEVEL — DEPARTMENT MANAGER | | | |
| LEVEL — SECTION MANAGER | | | |
| LEVEL — OTHERS | | | |

FIG. 13(a)

COLLATION (PASSWORD "a": PERSONNEL AND ACCOUNTING DEPARTMENT MANAGER)

| COLLATING CLEARANCE INFORMATION 9A a | CATEGORY | | |
|---|---|---|---|
| | PERSONNEL | ACCOUNTING | OTHERS |
| LEVEL — DEPARTMENT MANAGER | ○ | ○ | |
| LEVEL — SECTION MANAGER | | | |
| LEVEL — OTHERS | | | |

FIG. 13(b)

COLLATION (PASSWORD "b": ACCOUNTING SECTION MANAGER)

| COLLATING CLEARANCE INFORMATION 9A b | CATEGORY | | |
|---|---|---|---|
| | PERSONNEL | ACCOUNTING | OTHERS |
| LEVEL — DEPARTMENT MANAGER | | | |
| LEVEL — SECTION MANAGER | | ○ | |
| LEVEL — OTHERS | | | |

FIG. 14(a)

AUTHENTICATION (CIPHER KEY "y": PERSONNEL TERMINAL)

| AUTHENTICATING CLEARANCE INFORMATION 9By | CATEGORY | | |
|---|---|---|---|
| | PERSONNEL | ACCOUNTING | OTHERS |
| LEVEL — DEPARTMENT MANAGER | ○ | | |
| LEVEL — SECTION MANAGER | ○ | | |
| LEVEL — OTHERS | ○ | | |

FIG. 14(b)

AUTHENTICATION (CIPHER KEY "z": ACCOUNTING TERMINAL)

| AUTHENTICATING CLEARANCE INFORMATION 9Bz | CATEGORY | | |
|---|---|---|---|
| | PERSONNEL | ACCOUNTING | OTHERS |
| LEVEL — DEPARTMENT MANAGER | | ○ | |
| LEVEL — SECTION MANAGER | | ○ | |
| LEVEL — OTHERS | | ○ | |

FIG. 15

OPERATER: Fo1

| PERSONNEL INFORMATION LABEL INFORMATION | CATEGORY | | |
|---|---|---|---|
| | PERSONNEL | ACCOUNTING | OTHERS |
| LEVEL — DEPARTMENT MANAGER | fo11 | fo12 | fo13 |
| LEVEL — SECTION MANAGER | fo14 | fo15 | fo16 |
| LEVEL — OTHERS | fo17 | fo18 | fo19 |

FIG. 16

| OPERATER : Fo2 | | | |
|---|---|---|---|
| ACCOUNTING INFORMATION LABEL INFORMATION | CATEGORY | | |
| LEVEL | PERSONNEL | ACCOUNTING | OTHERS |
| DEPARTMENT MANAGER | fo21 | fo22 | fo23 |
| SECTION MANAGER | fo24 | fo25 | fo26 |
| OTHERS | fo27 | fo28 | fo29 |

FIG. 17

CONDITION DEFINITION OF ACCESS AUTHORITY    R: READ AUTHORITY    W: WRITE AUTHORITY    X: DELETE AUTHORITY fo11:
| COLLATING | AUTHENTICATING | ACCESS AUTHORITY |
|---|---|---|
| ○ | ○ | = RWX |
| ○ | | = R — — |
| | ○ | = — — — |
| | | = — — — | fo12: (NOT DEFINED)
| COLLATING | AUTHENTICATING | ACCESS AUTHORITY |
|---|---|---|
| ○ | ○ | = — — — |
| ○ | | = — — — |
| | ○ | = — — — |
| | | = — — — | fo13: (NOT DEFINED)
| COLLATING | AUTHENTICATING | ACCESS AUTHORITY |
|---|---|---|
| ○ | ○ | = — — — |
| ○ | | = — — — |
| | ○ | = — — — |
| | | = — — — | fo14:
| COLLATING | AUTHENTICATING | ACCESS AUTHORITY |
|---|---|---|
| ○ | ○ | = RW — |
| ○ | | = R — — |
| | ○ | = — — — |
| | | = — — — | fo15: (NOT DEFINED)
| COLLATING | AUTHENTICATING | ACCESS AUTHORITY |
|---|---|---|
| ○ | ○ | = — — — |
| ○ | | = — — — |
| | ○ | = — — — |
| | | = — — — | fo16: (NOT DEFINED)
| COLLATING | AUTHENTICATING | ACCESS AUTHORITY |
|---|---|---|
| ○ | ○ | = — — — |
| ○ | | = — — — |
| | ○ | = — — — |
| | | = — — — | fo17:
| COLLATING | AUTHENTICATING | ACCESS AUTHORITY |
|---|---|---|
| ○ | ○ | = R — — |
| ○ | | = — — — |
| | ○ | = — — — |
| | | = — — — | fo18: (NOT DEFINED)
| COLLATING | AUTHENTICATING | ACCESS AUTHORITY |
|---|---|---|
| ○ | ○ | = — — — |
| ○ | | = — — — |
| | ○ | = — — — |
| | | = — — — | fo19: (NOT DEFINED)
| COLLATING | AUTHENTICATING | ACCESS AUTHORITY |
|---|---|---|
| ○ | ○ | = — — — |
| ○ | | = — — — |
| | ○ | = — — — |
| | | = — — — |

FIG. 18

| CONDITION DEFINITION OF ACCESS AUTHORITY | | R: READ AUTHORITY | W: WRITE AUTHORITY | X: DELETE AUTHORITY | |
|---|---|---|---|---|---|
| fo21: (NOT DEFINED) COLLATING AUTHENTICATING ACCESS AUTHORITY <br> ○ ○ — — = — — — — <br> — — — — = — — — — <br> — — — — = — — — — <br> — — — — = — — — — | | fo22: COLLATING AUTHENTICATING ACCESS AUTHORITY <br> ○ ○ — — = R W X — <br> — ○ ○ — = R — — — <br> — — — — = — — — — <br> — — — — = — — — — | | fo23: (NOT DEFINED) COLLATING AUTHENTICATING ACCESS AUTHORITY <br> ○ — ○ — = — — — — <br> — ○ — ○ = — — — — <br> — — — — = — — — — <br> — — — — = — — — — | |
| fo24: (NOT DEFINED) COLLATING AUTHENTICATING ACCESS AUTHORITY <br> ○ ○ — — = — — — — <br> — — — — = — — — — <br> — — — — = — — — — <br> — — — — = — — — — | | fo25: COLLATING AUTHENTICATING ACCESS AUTHORITY <br> ○ ○ — — = R W — — <br> — ○ ○ — = R — — — <br> — — — — = — — — — <br> — — — — = — — — — | | fo26: (NOT DEFINED) COLLATING AUTHENTICATING ACCESS AUTHORITY <br> ○ — ○ — = — — — — <br> — ○ — ○ = — — — — <br> — — — — = — — — — <br> — — — — = — — — — | |
| fo27: (NOT DEFINED) COLLATING AUTHENTICATING ACCESS AUTHORITY <br> ○ ○ — — = — — — — <br> — — — — = — — — — <br> — — — — = — — — — <br> — — — — = — — — — | | fo28: COLLATING AUTHENTICATING ACCESS AUTHORITY <br> ○ ○ — — = R — — — <br> — — — — = — — — — <br> — — — — = — — — — <br> — — — — = — — — — | | fo29: (NOT DEFINED) COLLATING AUTHENTICATING ACCESS AUTHORITY <br> ○ — ○ — = — — — — <br> — ○ — ○ = — — — — <br> — — — — = — — — — <br> — — — — = — — — — | |

FIG.22(a)

AUTHENTICATING DEFAULT CLEARANCE INFORMATION

| LEVEL \ CATEGORY | | | | |
|---|---|---|---|---|
| F0 | ○ | | | |

F0: NEW CLEARANCE = OBTAINED CLEARANCE

FIG.22(b)

COLLATING DEFAULT CLEARANCE INFORMATION

| LEVEL \ CATEGORY | | | | |
|---|---|---|---|---|
| F0 | ○ | | | |

F0: NEW CLEARANCE = OBTAINED CLEARANCE

FIG.22(c)

AUTHENTICATING OBTAINED CLEARANCE INFORMATION (STORED IN IEF "1")

| LEVEL \ CATEGORY | | | | |
|---|---|---|---|---|
| F1 | ○ | | ○ | ○ |

F1: NEW CLEARANCE = LOGICAL SUM OF CURRENT CLEARANCE AND OBTAINED CLEARANCE

FIG.22(d)

COLLATING OBTAINED CLEARANCE INFORMATION (STORED IN IEF "2")

| LEVEL \ CATEGORY | | | | |
|---|---|---|---|---|
| F2 | ○ | | ○ | ○ |

F2: NEW CLEARANCE = LOGICAL SUM OF CURRENT CLEARANCE AND OBTAINED CLEARANCE

FIG. 23(a)

AUTHENTICATING OBTAINED CLEARANCE INFORMATION
( STORED IN IEF "3" )

| F3 | CATEGORY | | | |
|---|---|---|---|---|
| LEVEL | ○ | | | |
| | | ○ | ○ | |
| | | ○ | ○ | |
| | | | | |

F3 : NEW CLEARANCE = LOGICAL SUM OF CURRENT CLEARANCE AND OBTAINED CLEARANCE

FIG. 23(b)

OBJECT LABEL INFORMATION OF WEF "1"

| Fo : COMBINED LOGICAL FUNCTION | | | | |
|---|---|---|---|---|
| | CATEGORY | | | |
| LEVEL | fo 11 | — | — | — |
| | — | fo 22 | fo 23 | — |
| | — | fo 32 | — | — |
| | — | — | — | — |

Fo : fo 22 OR fo 23 OR fo 32

| | AUTHENTICATING | COLLATING | ACCESS AUTHORITY |
|---|---|---|---|
| fo 11 | ○ | ○ | - - - |
| fo 22 | ○ | ○ | R - - |
| fo 23 | ○ | ○ | - W - |
| fo 32 | ○ | ○ | - - X |

※ DEFINITION OF ACCESS AUTHORITY

R : READ AUTHORITY   W : WRITE AUTHORITY   X : DELETE AUTHORITY

| COLLATING CLEARANCE INFORMATION 9Aa | | CATEGORY | | |
|---|---|---|---|---|
| | | PERSONNEL | ACCOUNTING | OTHERS |
| LEVEL | DEPARTMENT MANAGER | ○ | ○ | |
| | SECTION MANAGER | | | |
| | OTHERS | | | |

| AUTHENTICATING CLEARANCE INFORMATION 9By | | CATEGORY | | |
|---|---|---|---|---|
| | | PERSONNEL | ACCOUNTING | OTHERS |
| LEVEL | DEPARTMENT MANAGER | ○ | | |
| | SECTION MANAGER | ○ | | |
| | OTHERS | ○ | | |

CLIENT 103A
pin:"a"

CLIENT 103B
pin:"a,c"

CLIENT 103C
pin:"a,b"

CLIENT 103A
pin:"a,d"

CARD TYPE RECORDING MEDIUM AND ACCESS CONTROL METHOD FOR CARD TYPE RECORDING MEDIUM AND COMPUTER-READABLE RECORDING MEDIUM HAVING ACCESS CONTROL PROGRAM FOR CARD TYPE RECORDING MEDIUM RECORDED

BACKGROUND OF THE INVENTION

1. Field of the Invention

The present invention relates to a card type recording medium such as an IC card used, for example, as an electronic money carrier, credit card, ID card, autonomy card, etc., further to an access control method for such a card type recording medium, and a computer-readable recording medium on which an access control program for the card type recording medium is recorded.

Recently, as IC cards have widely been used, information that need security, such as electronic money information, credit card information, clinical chart information, etc., have been stored in the IC cards. Accordingly, the IC cards are being required to securely store such information. In order to comply with such requirement, it is strongly requested to enhance security when the access control is performed by means of the command in conformity with the international standard (ISO 7816).

2. Description of the Related Art

The technique to perform the access control of a card type recording medium have been disclosed in the Japanese Patent Application Laid-open No. (hereunder, referred to simply as JP-A) 60-160491 (IC card), JP-A-60-205688 (portable medium), JP-A-60-205689 (portable medium), JP-A-60-205690 (portable medium), JP-A-60-207939 (recording system by an electronic device), and the like, which have been considered as effective means to enhance security for the card type recording medium.

The technique disclosed in the JP-A-60-160491 (IC card) will be described as an example with reference to FIG. 46(a), 46(b), and FIG. 47.

As shown in FIG. 46(a), an IC card 100 contains files 101-1, 101-2 to store data being access objects. The files 101-1, 101-2 are given an access authority information (security management information) 102-1, 102-2, respectively.

Further, a client 103A is given a password pin: "a", a client 103B is given a password pin: "a, c", and a client 103C is given a password pin: "a, b". Here, the access authority information 102-1, 102-2 given to the files 101-1, 101-2 both are "a, b". Therefore, only the client 103C having the password "a, b" can read the file 101-1, 101-2.

Under such an assumption, let's consider a method to newly give the authority to read the file 101-1 to the client 103A. However, the client 103A is not given the authority to access the file 101-2, and the client 103B is not given the authority to access the file 101-1. Further, the client 103C is assumed not to be given any influence.

In this case, as shown in FIG. 46(b), further giving a password "d" to the client 103A to change the password of the client 103A into "a, d", and changing the setting of the access authority information 102-1 given to the file 101-1 into the one as shown by the symbol 102-1' will be able to newly give an authority to read the file 101-1 to the client 103A.

Further, let's consider a method to newly give the authority to read the file 101-1 to a client 103D having the password "b, c".

In this case, as shown in FIG. 47, further giving a password "d" to the client 103D to change the password of the client 103D into "b, c, d", and changing the setting of the access authority information 102-1' given to the file 101-1 into the one as shown by the symbol 102-1" will be able to newly give an authority to read the file 101-1 to the client 103D.

Incidentally, the file 101-2 and the access authority information 102-2 are not illustrated in FIG. 46(b) and FIG. 47.

However, in the foregoing method of controlling an access to the card type recording medium, the method of setting and modifying the access authority and the method of using and maintaining/managing the security system are not easy for a user to understand; and the work to set and modify the access authority and the work to use and maintain/manage the security system become rather a nuisance for a designer of the security system, which is a problem.

In other words, when expanding or shrinking the access authorities of the clients 103A to 103D, the access authority information 102-1, 102-2 given to the files 101-1, 101-2 have to be reviewed, and the work to set and modify the access authority will give an influence to the entire system. That is, to change the access authority after having defined the security system as mentioned above will require to review the whole security system in advance, which makes the work to set and modify the access authority considerably complicated.

The techniques disclosed in the other applications laid open holds the similar problems.

Further, when considering a multi-purpose use in which an electronic money information, credit card information, autonomy information, etc., are stored in one card type recording medium, it is considered necessary to be able to control the security at one place and to be able to maintain the independence of information among applications, for the operation of the security system.

SUMMARY OF THE INVENTION

The present invention has been made in view of the foregoing problems, and an object of the present invention is to provide a card type recording medium and an access control method for the card type recording medium, whereby the management and operation of the security system can reliably be performed while the work to set and modify the access authority can be simplified even in a multi-purpose use, and a computer-readable recording medium on which an access control program for the card type recording medium for controlling accesses of data by access subjects is recorded.

In order to accomplish the foregoing object, the card type recording medium relating to the present invention contains storage units to store data being access objects and an access control unit to control an access to the data by an access subject, in which the access control unit is designed to comprise an access subject identification information generating unit to generate an access subject identification information for identifying the access subject, an access authority information read-in unit to read access authority information for obtaining an access authority set in correspondence with the data that the access subject requests to access, and a control unit to obtain an access authority in correspondence with the access subject identification information from the access subject identification information and the access authority information, and to control an access to the data by the access subject on the basis of the access authority obtained.

And, in the card type recording medium relating to the invention, the access subject identification information is comprised of an information relating to at least more than two conditions for accessing.

Further, in the card type recording medium relating to the invention, the access subject identification information is comprised of a collating access subject identification information for collating an operator and an authenticating access subject identification information for authenticating an application.

And, in the card type recording medium relating to the invention, the collating access subject identification information corresponds to an access subject collating information that indicates a status of the operator, and the authenticating access subject identification information corresponds to an access subject authenticating information for identifying the application.

Further, in the card type recording medium relating to the invention, the collating access subject identification information and the authenticating access subject identification information are expressed by a matrix of at least one category information and a level information having hierarchies.

And, in the card type recording medium relating to the invention, the access authority information are comprised of access authority elements determined on the condition of the collating access subject identification information and the authenticating access subject identification information for each of the elements of the matrix and an arithmetic function using the access authority elements.

Further, in the card type recording medium relating to the invention, the access subject identification information generating unit holds (1) default collating access subject identification information, (2) default authenticating access subject identification information, (3) access subject collating information for reference, (4) access subject authenticating information for reference, (5) access subject identification information generating information, and (6) an arithmetic function. In the above, (1) the default collating access subject identification information is information for collating an operator, (2) the default authenticating access subject identification information is information for authenticating an application, (3) the access subject collating information for reference is information for indicating a status of the operator, (4) the access subject authenticating information for reference is information for identifying the application, (5) the access subject identification information generating information is information for generating a collating access subject identification information for collating the operator in correspondence with the access subject collating information for reference, and for generating an authenticating access subject identification information for authenticating the application in correspondence with the access subject authenticating information for reference, and (6) the arithmetic function is a function for reflecting the generated collating access subject identification information on the default collating access subject identification information, and for reflecting the generated authenticating access subject identification information generated on the default authenticating access subject identification information.

And, the card type recording medium relating to the invention contains a plurality of logic channels through which the access subject accesses the data, and the access control unit controls an access to the data by the access subject independently for each of the logic channels.

Further, in the card type recording medium relating to the invention, the access control unit generates the access subject identification information for each of the logic channels.

And, the card type recording medium relating to the invention holds an audit log being an information in which the operation of the access control unit is audited.

On the other hand, an access control method for the card type recording medium relating to the invention is to control an access to the data by an access subject, in the card type recording medium containing storage units to store data being access objects. The method includes an access subject identification information generating step to generate an access subject identification information for identifying the access subject, and an access authority information read-in step to read in access authority information for obtaining an access authority set in correspondence with the data that the access subject requests to access. Further, the method includes a control step that obtains an access authority in correspondence with the access subject identification information from the access subject identification information and the access authority information, and controls an access to the data by the access subject on the basis of the access authority obtained.

And, in the access control method for the card type recording medium relating to the invention, when the access subject inputs an access subject collating information to indicate a status of an operator and an access subject authenticating information for identifying an application, the access subject identification information generating step compares the inputted access subject collating information and the inputted access subject authenticating information with an access subject collating information for reference and an access subject authenticating information for reference. And if the two coincide, the access subject identification information generating step generates a collating access subject identification information for collating the operator and an authenticating access subject identification information for authenticating the application in correspondence with the access subject collating information for reference and the access subject authenticating information for reference, and reflects the generated collating access subject identification information and the generated authenticating access subject identification information on a default collating access subject identification information for collating the operator and a default authenticating access subject identification information for authenticating the application.

Further, in the access control method for the card type recording medium relating to the invention, the access subject identification information is designed to contain a collating access subject identification information for collating the operator and an authenticating access subject identification information for authenticating the application; and the control step determines access authority elements on the condition of the collating access subject identification information and the authenticating access subject identification information, and obtains the access authority in correspondence with the access subject identification information through an arithmetic operation using the access authority elements.

Further, a computer-readable recording medium relating to the invention has an access control program for the card type recording medium recorded, and the access control program controls through a computer an access to a data by an access subject in the card type recording medium containing storage units to store data being access objects. In the computer-readable recording medium, the access control program for the card type recording medium causes the computer to function by means of an access subject identification information generating unit to generate an access subject identification information for identifying the access subject, an access authority information read-in unit to read access authority information for obtaining an access authority set in correspondence with the data that the access subject requests to access, and a control unit to obtain an access authority in correspondence with the access subject identification information from the access subject identification information and the access authority information, and to control an access to the data by the access subject on the basis of the access authority obtained.

According to the invention being thus described, even in case of a multipurpose use of the card type recording medium, the setting and modifying work can be simplified and the management and operation of the security system can reliably performed, which is advantageous.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 7 is a chart to illustrate one example of an audit log;

FIG. 9($a$) through FIG. 9($c$) each are charts to illustrate a state in which collating clearance information is updated;

FIG. 10($a$) through FIG. 10($c$) each are charts to explain a clearance information;

FIG. 11 is a chart to explain an access authority information;

FIG. 12 is a chart to illustrate a default clearance information;

FIG. 13($a$), FIG. 13($b$) each are charts to illustrate a collating clearance information;

FIG. 14($a$), FIG. 14($b$) each are charts to illustrate an authenticating clearance information;

FIG. 15 is a chart to illustrate an access authority information given to a personnel information;

FIG. 16 is a chart to illustrate an access authority information given to an accounting information;

FIG. 17 is a chart to illustrate a definition of conditions relating to the access authority;

FIG. 18 is a chart to illustrate a definition of conditions relating to the access authority;

FIG. 22($a$) through FIG. 22($d$) each are charts to illustrate a detailed file construction shown in FIG. 21;

FIG. 23($a$), FIG. 23($b$) each are charts to illustrate a detailed file construction shown in FIG. 21;

DESCRIPTION OF THE PREFERRED EMBODIMENT

Preferred embodiments of the present invention will hereafter be described in detail with reference to the accompanying drawings.

(a) Description of One Embodiment

Figure 1:
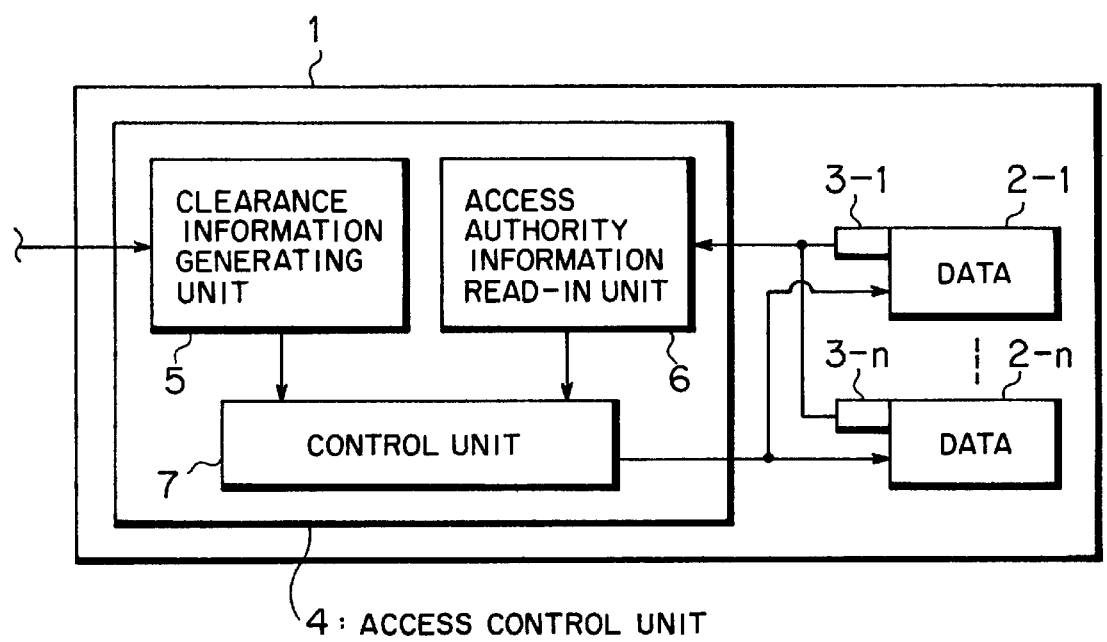
FIG. 1 is a functional block diagram to illustrate a construction of a card type recording medium relating to one embodiment of the present invention.
Figure 2:
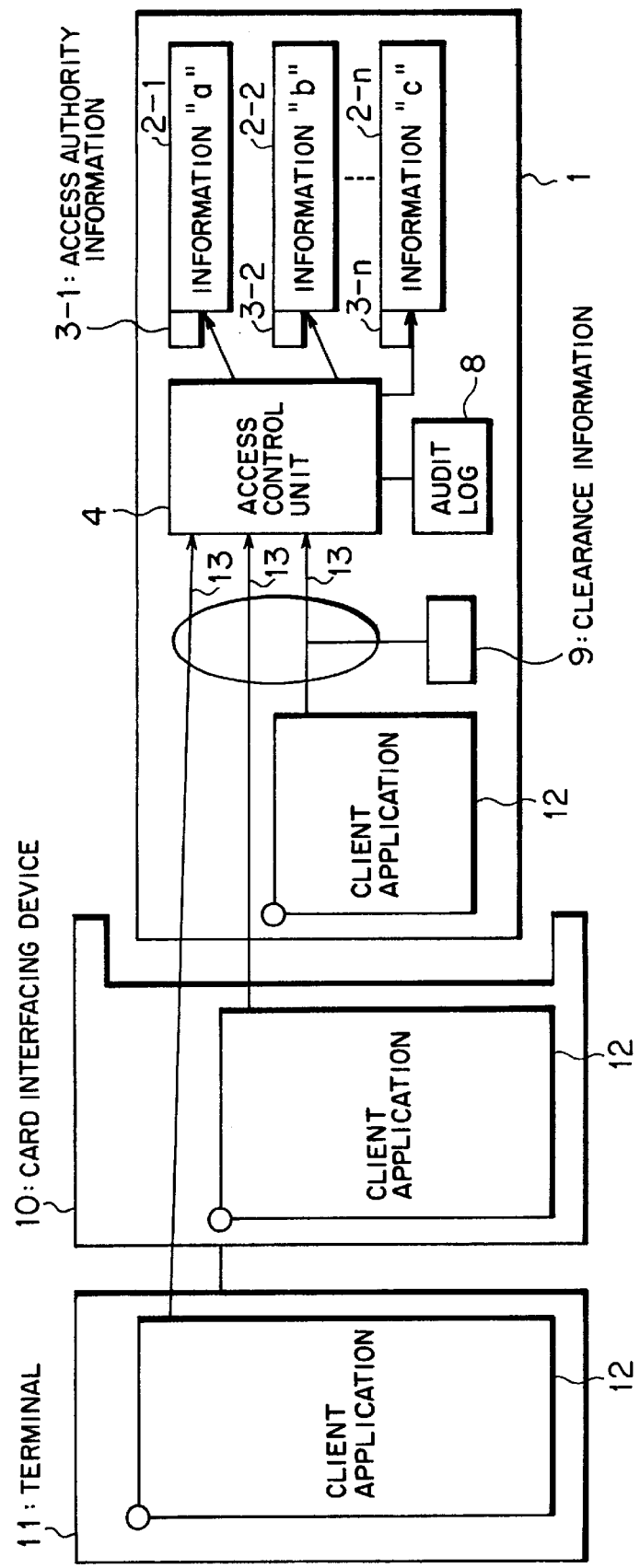
FIG. 2 is a functional block diagram to illustrate a construction of a card type recording medium relating to one embodiment of the present invention.
Figure 3:
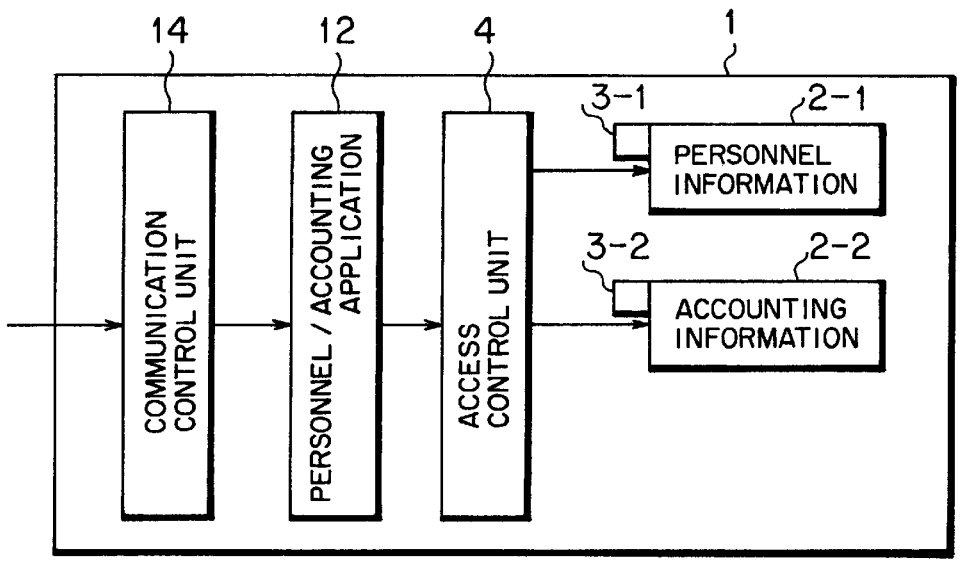
FIG. 3 is a functional block diagram to illustrate a construction of a card type recording medium relating to one embodiment of the present invention.

FIG. 1 through FIG. 3 are functional block diagrams to illustrate a construction of a card type recording medium relating to the one embodiment of the present invention. A card type recording medium 1 shown in FIG. 1 through FIG. 3 is, for example, an IC card used as an electronic money carrier, credit card, ID card, autonomy card, etc. The card type recording medium 1 contains files (storage unit) 2-i ($i=1\sim n$, n: optional natural number) to store data being access objects, and an access control unit 4 for controlling a data access by an access subject [hereunder, an owner of the card type recording medium 1, a terminal used during an access by this owner, an application (client application) to execute an actual access are referred to as an access subject, as a generic name].

Here, a data in the file 2-$i$ is provided with an access authority information 3-$i$ ($i=1\sim n$, n : optional natural number) for obtaining an access authority that indicates whether or not an access subject can access the data.

And, as shown in FIG. 1, the access control unit 4 is provided with a clearance information generating unit (access subject identification information generating unit) 5 to generate a clearance information (access subject identification information, indicated by the symbol 9 in FIG. 2) for identifying an access subject, an access authority information read-in unit 6 to read in the access authority information 3-$i$ set in correspondence with a data that the access subject requests to access, and a control unit 7 to obtain an access authority in correspondence with the access subject identification information 9 from the foregoing clearance information 9 and the access authority information 3-$i$, and to control an access to the data by the access subject on the basis of the access authority thus obtained.

Further, as shown in FIG. 2, FIG. 3, the card type recording medium 1 is provided with an client application 12 to actually perform an access, and a logic channel 13 between this client application 12 and the access control unit 4.

And, as shown in FIG. 2, the card type recording medium 1 is designed to hold an audit log 8 as an audit content of the operation in the access control unit 4. Further, FIG. 7 illustrates an example of the audit log. The audit log is stored in an audit log IEF (internal elementary file; see FIG. 19 being used later). Here, the IEF is configured in a forward record structure, and the audit log is sequentially stored in the order of the command receive/process.

Further, the symbol 11 indicates a terminal to execute various processes that use data in the card type recording medium 1, and the symbol 10 indicates a card interfacing device to transmit a read/write instruction from the terminal 11, in which the card type recording medium 1 is inserted and connected.

And, the client application 12 may be installed inside the card interfacing device 10, and/or the terminal 11; in FIG. 2, each of the card type recording medium 1, the card interfacing device 10, and the terminal 11 contains the client application 12.

Further, as shown in FIG. 3, the card type recording medium 1 is provided with a communication control unit 14 as an interface unit with the card interfacing device 10. Further, FIG. 3 will be detailed later.

The foregoing clearance information 9 and the access authority information 3-$i$ will now be described.

The clearance information 9 is an information to identify an access subject. However, in the card type recording medium 1 relating to the embodiment, the clearance information 9 is comprised of an information relating to at least more than two conditions for accessing.

Figure 5:
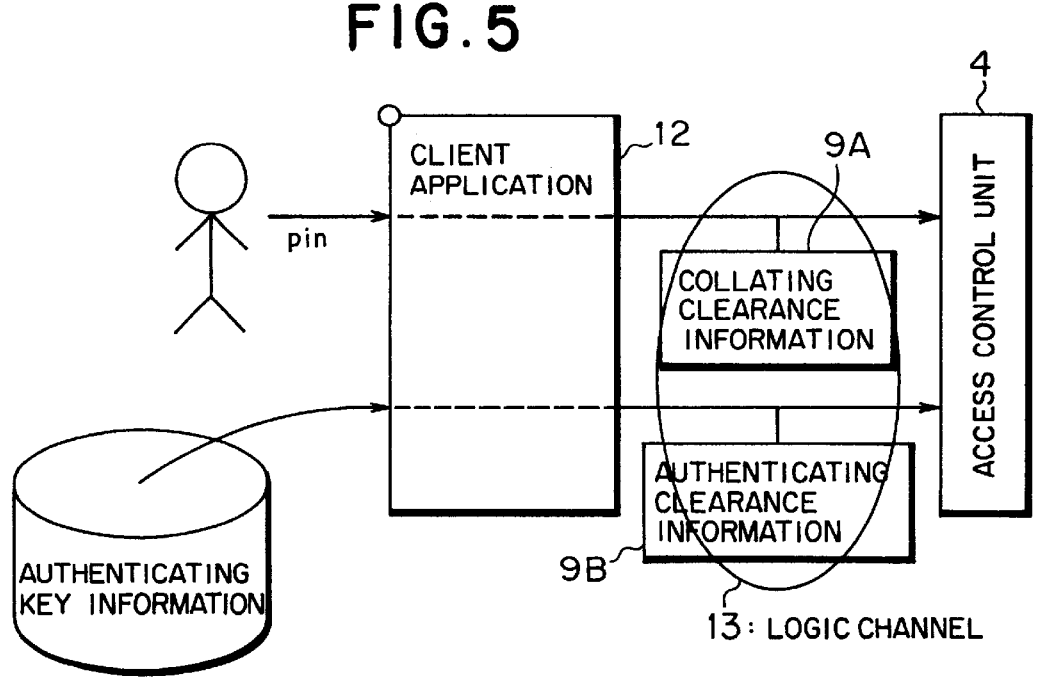
FIG. 5 is a chart to explain a clearance information.

Concretely, as shown in FIG. 5, the clearance information 9 is comprised of a collating clearance information 9A and an authenticating clearance information 9B.

Here, the collating clearance information 9A is an information to collate an operator in order to confirm whether the operator is the owner of the card type recording medium 1, which corresponds to an access subject collating information [password (pin)] that indicates the identity of the operator.

And, the authenticating clearance information 9B is an information to authenticate the client application 12 in order to confirm whether the access is made by using the accessible terminal 11, which corresponds to an access subject authenticating information (authenticating key information transmitted from the terminal 11) for identifying the client application 12.

And, as shown in FIG. 10($a$), FIG. 10($b$), the collating clearance information 9A and the authenticating clearance information 9B are expressed by a matrix that is comprised of at least one category information and a level information having hierarchies. Further, in FIG. 10($a$), FIG. 10($b$), the names of the departments (personnel, accounting, general affairs, development, purchase) in a corporation are used as one example of the category information, and the names of the managerial positions (department manager, department manager in charge, section manager, general-duties grade) in a corporation are used as one example of the level information having hierarchies. And, FIG. 10($c$) virtually expresses a state in which the collating clearance information 9A and the authenticating clearance information 9B are combined.

And, in this embodiment, in order to generate the collating clearance information 9A and the authenticating clearance information 9B, the clearance information generating unit 5 generates a default collating clearance information, a default authenticating clearance information, a password for reference (access subject collating information for reference), an authenticating key information for reference (access subject authenticating information for reference), and a collating clearance information in correspondence with the password for reference. And, the clearance information generating unit 5 holds an arithmetic function to reflect an access subject identification information generating information for generating an authenticating clearance information in correspondence with the authenticating key information for reference and a generated collating clearance information on a default collating clearance information, and to reflect the generated authenticating clearance information on the default authenticating clearance information. Further, the generation of the collating clearance information 9A and the authenticating clearance information 9B using these information will be described later.

And, the access authority information 3-$i$ is an information whereby an access subject has an access authority. In the card type recording medium 1 relating to the embodiment, the access authority information 3-$i$ is configured with access authority elements (see the symbol Q in FIG. 11) determined for each matrix element on the condition of the collating clearance information 9A and the authenticating clearance information 9B, and an arithmetic function [see the equation (1) in FIG. 11] that employs these access authority elements. Further, the access authority information 3-$i$ is set appropriately by the designer of the security system.

Further, in the card type recording medium 1 relating to the embodiment, practically a program (hereunder, referred to as access control program for the card type recording medium) recorded on a ROM (not illustrated) inside the card type recording medium 1 and on a recording medium (not illustrated) of a disk drive, etc., in a computer of the terminal 11 shown in FIG. 2, etc., is read out on the memory (RAM; not illustrated) inside the card type recording medium 1 and in the computer of the terminal 11 shown in FIG. 2, etc., and the program is started and executed by a processing circuit (MPU inside the card type recording medium 1 or CPU in the computer of the terminal 11 shown in FIG. 2, etc.); and thus, the function corresponding to the foregoing access control unit 4 (namely, the function corresponding to the clearance information generating unit 5, the access authority information read-in unit 6, and the control unit 7) is achieved in the operation of the processing circuit.

Here, the access control program for the card type recording medium causes the card type recording medium 1 to function by means of the clearance information generating unit 5 for generating the clearance information 9 (the collating clearance information 9A, the authenticating clearance information 9B) for identifying an access subject, the access authority information read-in unit 6 for reading in the access authority information 3-$i$ set in correspondence with a data that the access subject requests to access, and the control unit 7 for controlling an access to a data by the access subject on the basis of an access authority that is obtained in correspondence with the clearance information 9 from the foregoing clearance information 9 and the access authority information 3-$i$.

Here, the access control of the card type recording medium 1 relating to the embodiment will be described to cite a case in which the personnel and accounting department manager and the accounting section manager in a corporation access the personnel information stored in the card type recording medium 1.

Figure 8A:
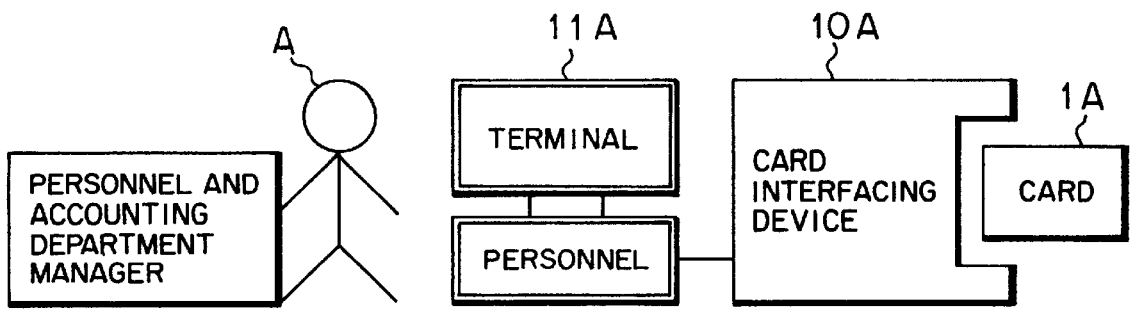
FIG. 8($a$), FIG. 8($b$) each are charts to illustrate an example in which a security system using an IC card as the card type recording medium is constructed.
Figure 8B:
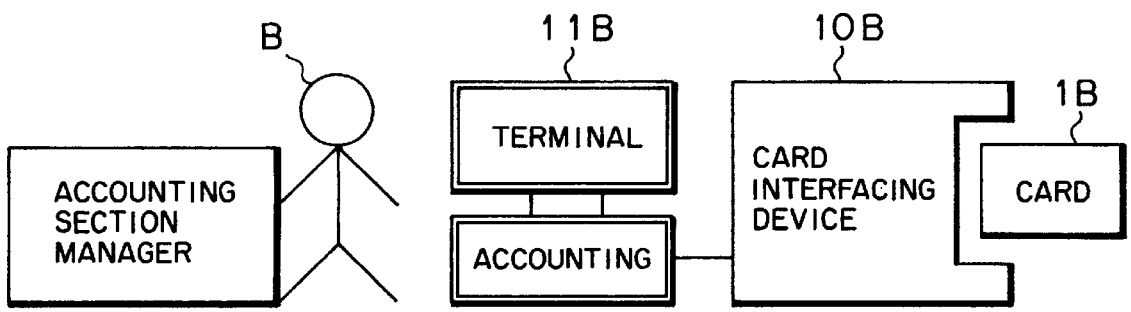

A construction of a security system using an IC card as the card type recording medium 1 is illustrated in FIG. 8(a), FIG. 8(b).

Here, let's assume that the personnel and accounting department manager (indicated by the symbol A) possesses a password to prove the status of the personnel and accounting department manager, and the accounting section manager (indicated by the symbol B) possesses a password to prove the status of the accounting section manager.

And, the symbol 11A indicates a terminal that is able to perform a transaction on the personnel matter as to an IC card 1A, and the symbol 11B indicates a terminal that is able to perform a transaction on the accounting matter as to an IC card 1B. Further, the symbols 10A, 10B indicate the foregoing card interfacing devices.

And, the IC cards 1A, 1B have the construction as shown in the foregoing FIG. 3. In FIG. 3, the symbol 14 indicates a communication control unit that executes the transmit/inform processing of an instruction with the card interfacing unit, the symbol 12 indicates a client application to execute a personnel processing or an accounting processing, the symbol 4 indicate the foregoing access control unit, the symbols 2-1 and 2-2 indicate files to store the personnel information and the accounting information, respectively, and the symbols 3-1 and 3-2 each indicate access authority information given to the personnel information in the file 2-1 and the accounting information in the file 2-2, respectively.

Further, when executing the personnel processing or the accounting processing by using the terminals 11A, 11B shown in FIG. 8(a), FIG. 8(b), subjects that perform an access such as the reading or writing from or to the personnel information and the accounting information inside the IC cards 1A, 1B, namely, the personnel and accounting department manager A, the accounting section manager B, the terminal 11A, the terminal 11B, the client application 12 inside the IC cards 1A, 1B that actually performs an access, or a client application, not illustrated, inside the terminals 11A, 11B are called an access subject generically.

Figure 4:
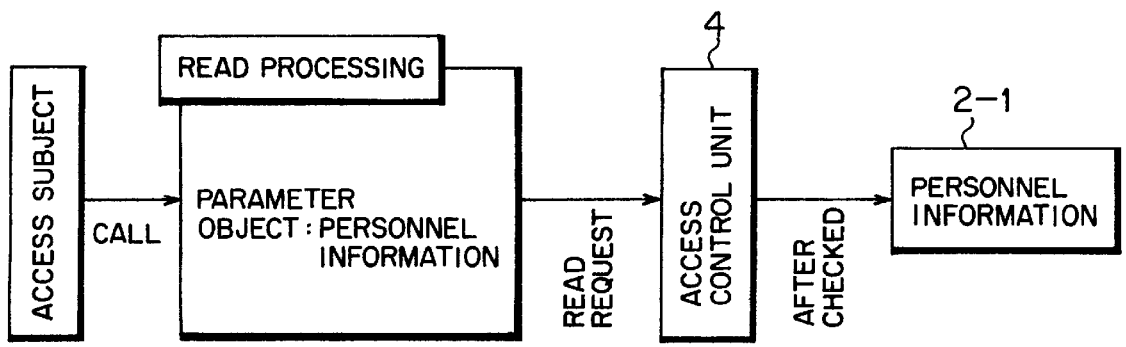
FIG. 4 is a chart to explain the operation of the card type recording medium relating to one embodiment of the present invention.

The IC cards 1A, 1B possess a structure that the information on an access subject necessarily passes through the access control unit 4 when the access subject accesses the personnel information or the accounting information. That is, the IC cards 1A, 1B in the embodiment possess a construction as shown in FIG. 4.

The access subject is designed to acquire a default clearance information (default clearance information of the access subject) from the access control unit 4 as shown in FIG. 12, in order to demonstrate that the access subject itself possesses the proper authority to access the personnel information or the accounting information inside the IC cards 1A, 1B. Further, the default clearance information is provided with two types, namely, the authenticating default clearance information and the collating default clearance information, each of which is loaded as an initial value of the clearance information at an initializing process.

In the embodiment, the principal collation (Verify) command according to the international standard (ISO 7816-4) is used in order to collate that a person to access is the person who is acknowledged to access. And, the External Authenticate command according to the international standard (ISO 7816-4) is used in order to authenticate that the terminals 11A, 11B are the terminal that is acknowledged to access.

Further, the password in the principal collation command and the cipher key information (authenticating key information) in the External Authenticate command are linked with the collating clearance information 9A and the authenticating clearance information 9B, respectively.

Further, the collating clearance information obtained by collation in the embodiment is illustrated in FIG. 13(a), FIG. 13(b), and the authenticating clearance information obtained by authentication in the embodiment is illustrated in FIG. 14(a), FIG. 14(b). Further, the collating clearance information 9A$a$ shown in FIG. 13(a) and the authenticating information 9B$y$ shown in FIG. 14(a) correspond to the personnel and accounting department manager A, and the collating clearance information 9A$b$ shown in FIG. 13(b) and the authenticating information 9B$z$ shown in FIG. 14(b) correspond to the accounting section manager B.

And, as mentioned above, the access authority information 3-1, 3-2 for generating the access authority in correspondence with the clearance information 9A, 9B each are defined in correspondence to the personnel information and the accounting information inside the IC cards 1A, 1B.

Here, FIG. 15 illustrates a part of the access authority information 3-1 given to the personnel information, and FIG. 16 illustrates a part of the access authority information 3-2 given to the accounting information.

Further, the access authority approval operators Fo1, Fo2 [see FIG. 15, FIG. 16 and the following equations (2), (3)] and the condition to approve the access authority (see access authority elements fo11-fo29; FIG. 17, FIG. 18) are defined in correspondence to the access authority information 3-1, 3-2 in order to obtain the access authority of an access subject by arithmetic operation. Further, FIG. 17 illustrates a part of the access authority information 3-1 given to the personnel information, and FIG. 18 illustrates a part of the access authority information 3-2 given to the accounting information.

$$Fo1=fo11+fo14+fo17 \quad (2)$$

$$Fo2=fo22+fo25+fo28 \quad (3)$$

In case of the access authority information 3-1 given to the personnel information shown in FIG. 17, for example, the access authority element fo11 defines the access authority in correspondence to the access subject having the clearance information of the "department manager/personnel (namely, personnel department manager)".

And, in the access authority information 3-1, 3-2, all of the access authorities (R: read authority, W: write authority, X: delete authority) are set to be approved to the access subject that has obtained both the collating clearance information 9A and the authenticating clearance information 9B. And, the access subject that has obtained only the collating clearance information 9A is set to be approved only to read, and the others are set not to be approved to access the personnel information 2-1.

And, the clearance information 9A, 9B of an access subject obtained by collation and authentication is held in the access control unit 4 until the access subject ends the access.

Figure 19:
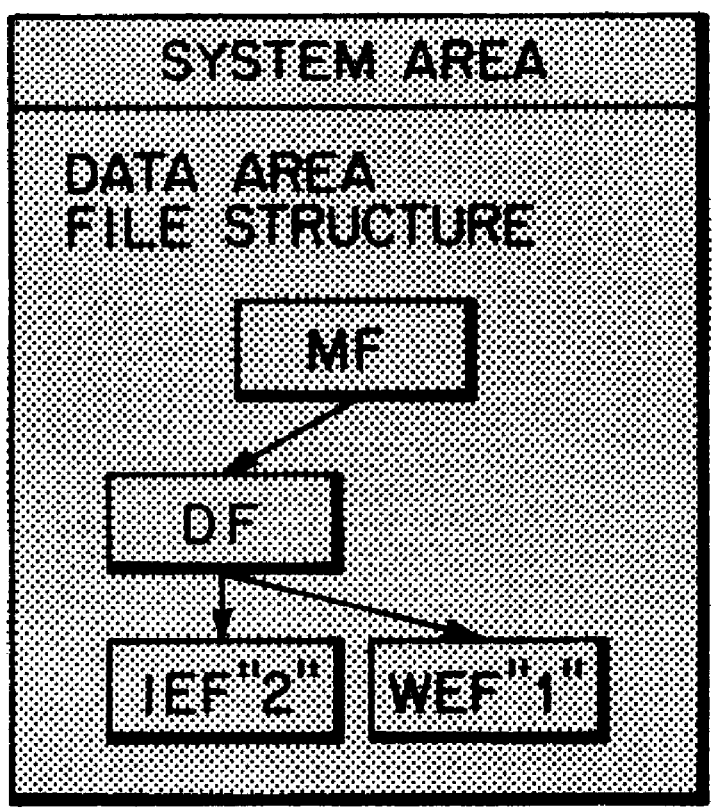
FIG. 19 is a chart to illustrate an area segmentation of a nonvolatile memory in an IC card.

Further, the data inside the IC card 1 (1A, 1B) has a structure as shown in FIG. 19.

FIG. 19 illustrates an area segmentation of a nonvolatile memory inside the IC card 1, and the foregoing authenticating default clearance information and the collating default clearance information are stored in the system region.

Figure 20:
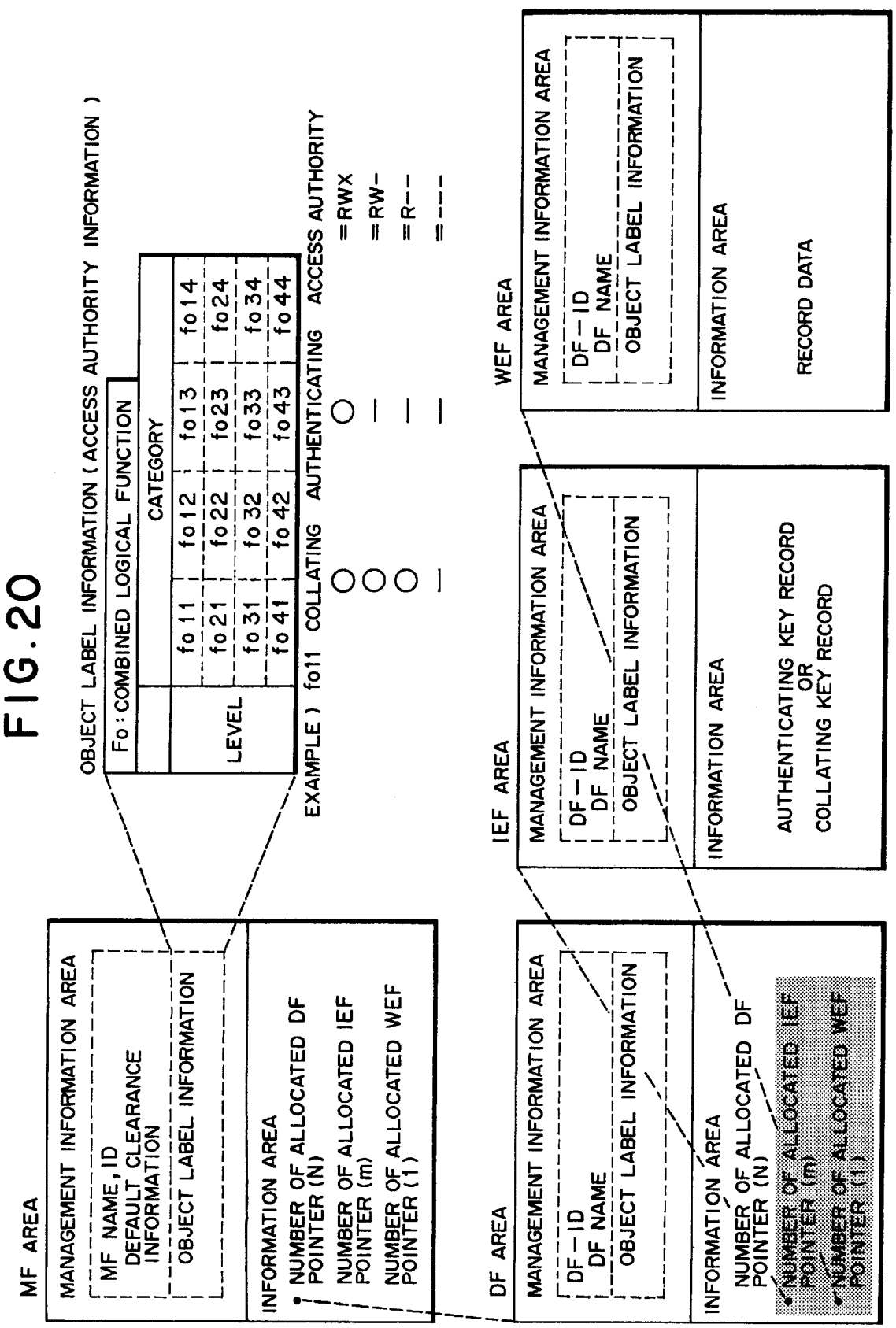
FIG. 20 is a chart to illustrate a detailed file construction of a data area shown in FIG. 19.

Further, FIG. 20 illustrates a detailed file construction of a data area shown in FIG. 19. Further, in FIG. 19, FIG. 20, the MF (master file) is the basis of the DF (dedicated file). And, the EF (elementary file) includes the IEF (internal elementary file) and WEF (work elementary file). The IEF is an area to store data that an authenticating key, a collating key, and a program except the client application inside the IC card 1 use for the purpose of management and control. The WEF is an area to store data that not the programs inside the IC card 1, but the external devices (for example, the terminals 11, 11A, 11B, etc.) use (further, the content of data is defined arbitrarily by the external devices).

Further, the description of the access control of the card type recording medium 1 relating to the embodiment presupposes the file constructions shown in FIG. 21(a), FIG. 21(b), FIG. 22(a)–FIG. 22(d), FIG. 23(a), and FIG. 23(b). These drawings illustrate only the necessary data for the description.

According to the foregoing construction, in the card type recording medium 1 relating to the one embodiment of the present invention, when an access subject requests an access to a data inside the card type recording medium 1, the access control unit 4 executes the access control to the access request.

Figure 37:
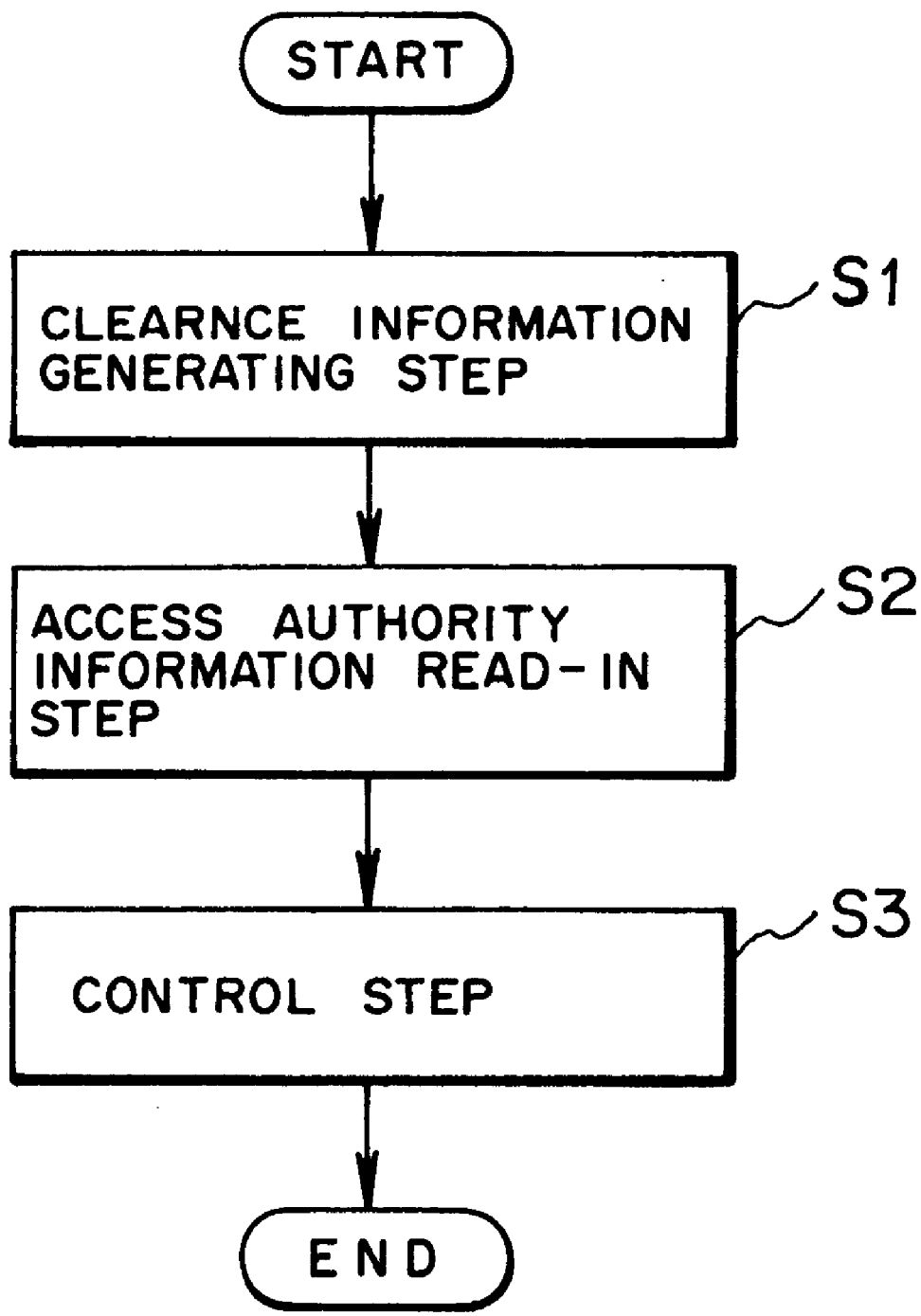
FIG. 37 through FIG. 45 each are flow charts to explain the operation of the card type recording medium relating to one embodiment of the present invention.

At this moment, in the access control unit 4, first the clearance information generating unit 5 generates the clearance information 9 (collating clearance information 9A, authenticating clearance information 9B) for identifying the access subject on the basis of a password and a cipher key information (authenticating key information) that have been transmitted from the access subject (clearance information generating step; step S1 in FIG. 37).

To enter into the details, when the access subject inputs the password to indicate the status of the operator and the cipher key information for identifying the application, the clearance information generating unit 5 compares the inputted password and cipher key information with the password for reference and the cipher key information for reference. And if they coincide, the clearance information generating unit 5 generates, using the foregoing clearance information generating information, the collating clearance information and the authenticating clearance information in correspondence with the password for reference and the cipher key information for reference; and using the foregoing arithmetic function, the clearance information generating unit 5 reflects the generated collating clearance information and authenticating clearance information on the default collating clearance information and the default authenticating clearance information (namely, updates the clearance information), and thus generates the collating clearance information 9A and the authenticating clearance information 9B.

Figure 31:
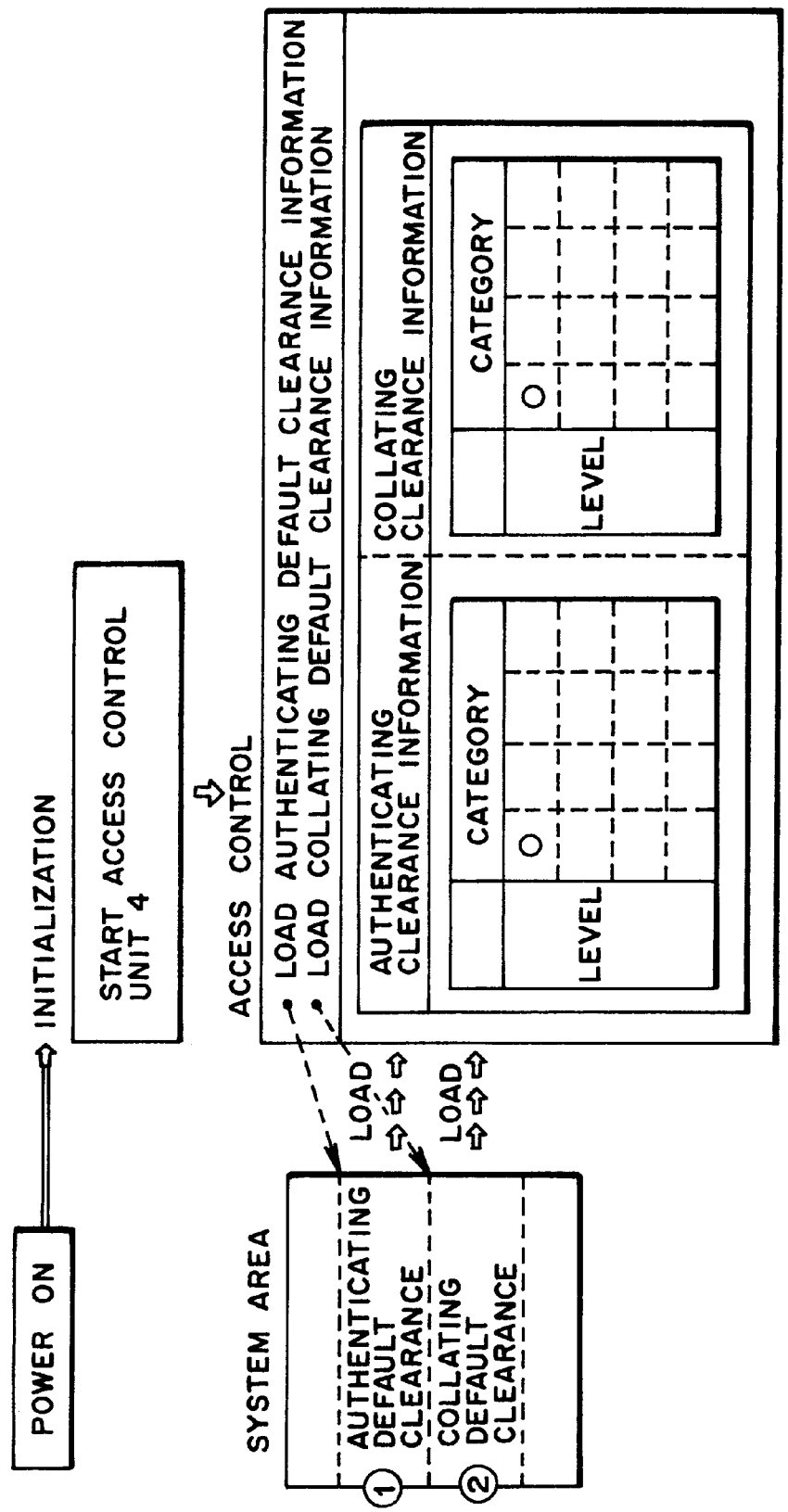
FIG. 31 is a chart to explain the generation of a default clearance information.

Further, the generation of the default clearance information will be described referring to FIG. 31. As shown in FIG. 31, when the card type recording medium (IC card) 1 is powered, the MPU inside the card type recording medium 1 is reset to start the initialization. And, at this initialization, the access control unit 4 loads the default authenticating clearance information and the default collating clearance information from the foregoing system area, and thereby generates the default clearance information.

Figure 32:
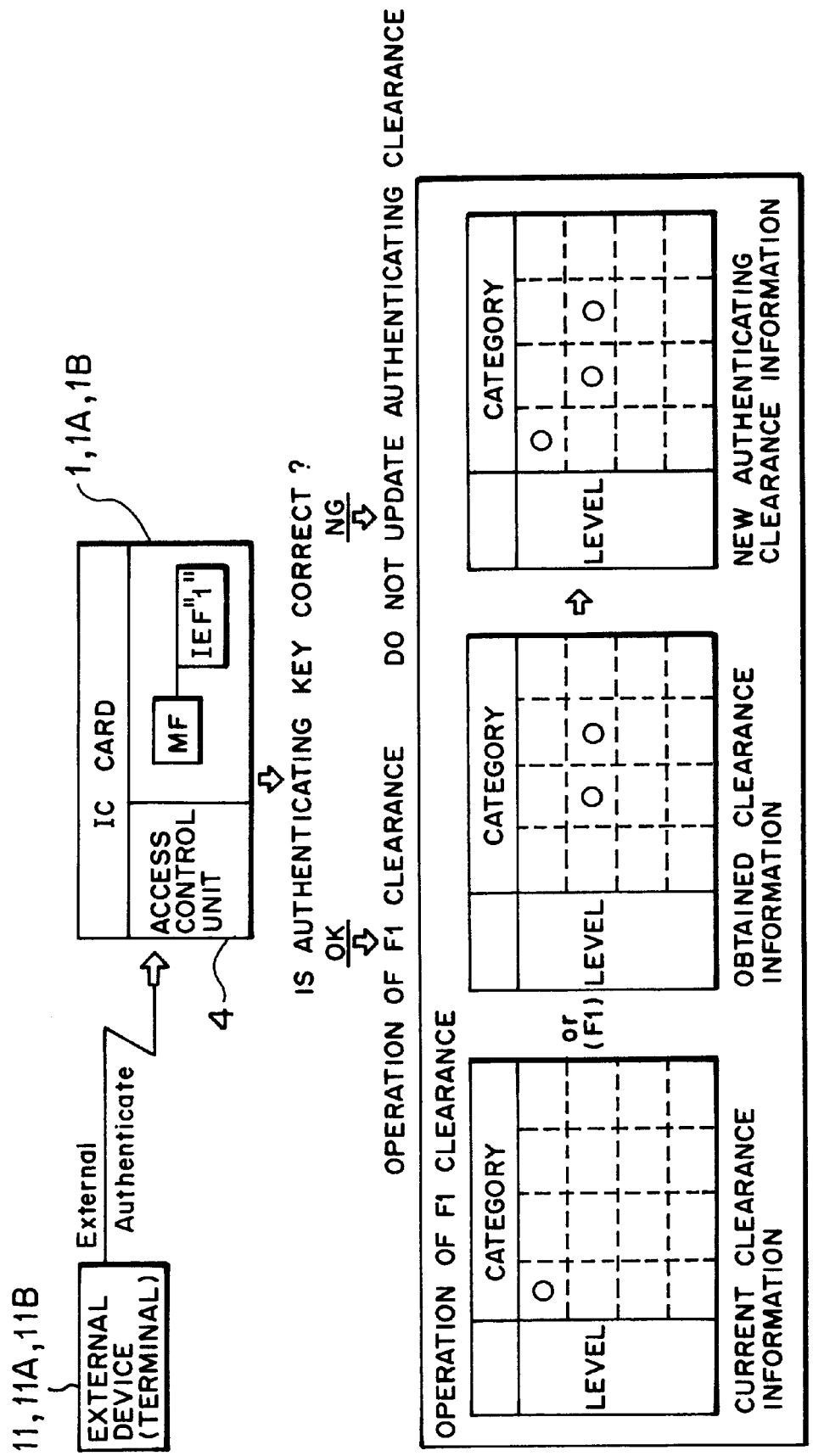
FIG. 32 through FIG. 34 each are charts to explain the update of a clearance information.
Figure 33:
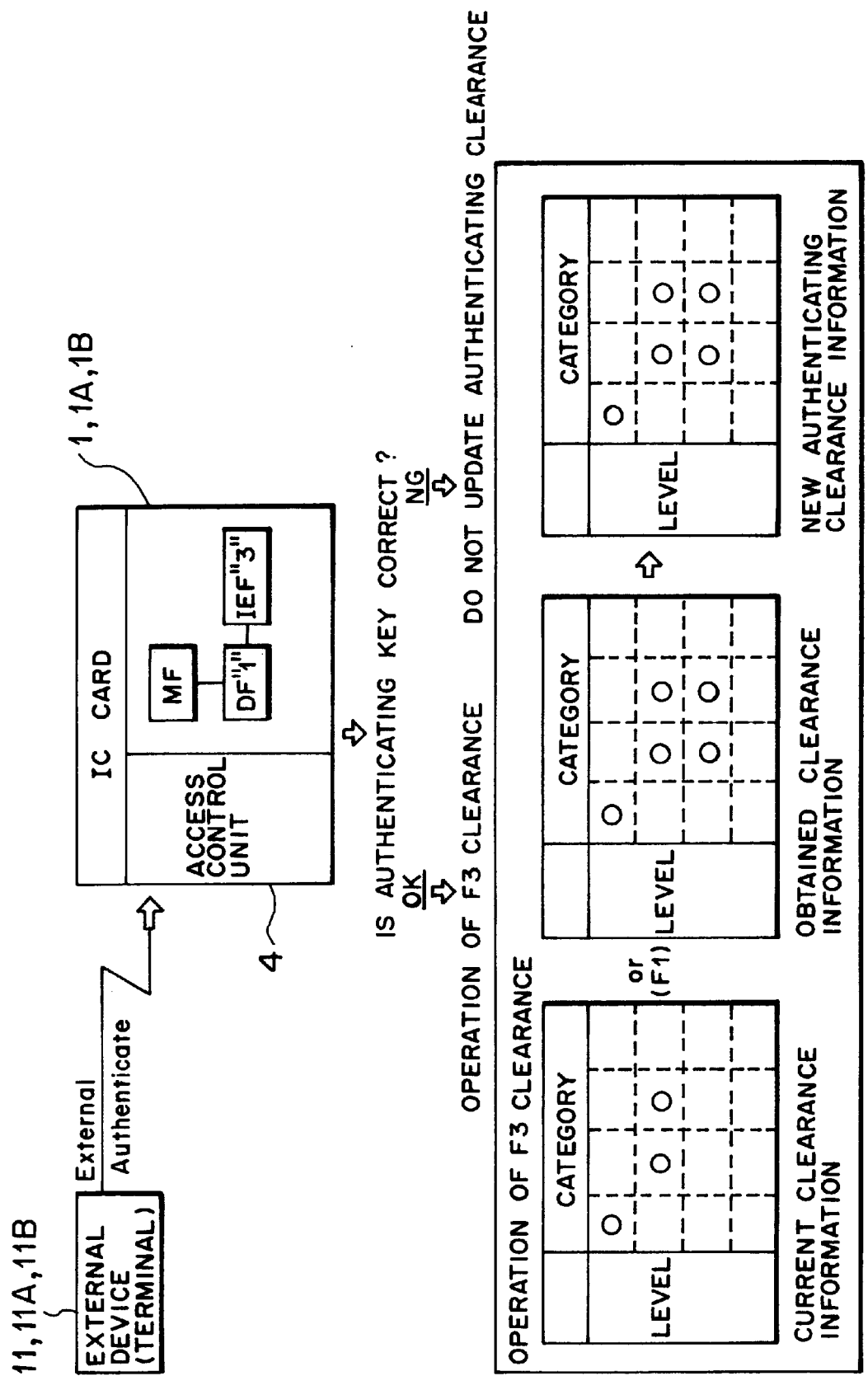
Figure 34:
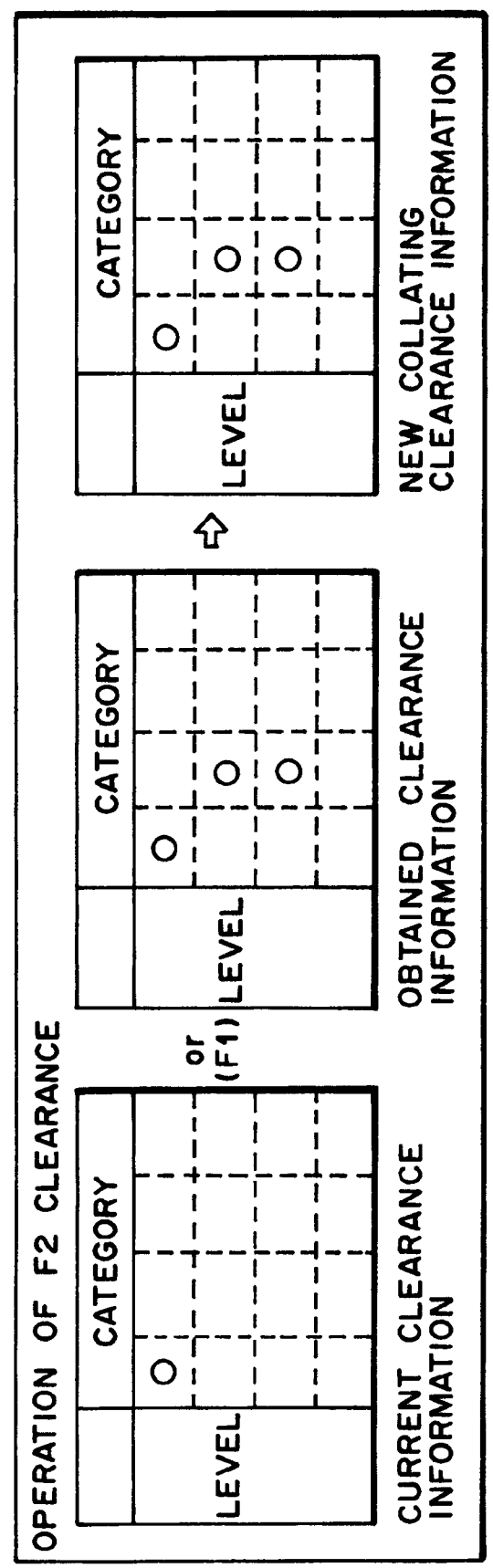

Further, the update of the clearance information will be described referring to FIG. 32 to FIG. 34.

First, the update of the authenticating clearance information will be described. As shown in FIG. 32, when the authenticating key (this authenticating key is stored in the area of the IEF "1") is loaded in the MF, a default authenticating clearance information is obtained. And if the authenticating key is correct, the authenticating clearance information is updated on the basis of the foregoing generated authenticating clearance information. Further, as shown in FIG. 33, when the authenticating key (this authenticating key is stored in the area of the IEF "3") is loaded in the DF "1", an updated authenticating clearance information is obtained. And if the authenticating key is correct, the authenticating clearance information is further updated on the basis of the foregoing generated authenticating clearance information.

Next, the update of the collating clearance information will be described. When the collating pin (collating key; this collating key is stored in the area of the IEF "2") is loaded in the MF, a default collating clearance information is obtained. And if the collating key is correct, the collating clearance information is updated on the basis of the foregoing generated collating clearance information (see FIG. 34). Incidentally, FIG. 9(a) to FIG. 9(c) also illustrate the state of the collating clearance information being updated.

Next, in the access control unit 4, the access authority information read-in unit 6 reads in the access authority information 3-i set in correspondence with a data that the access subject requests to access (access authority information read-in step; step S2 in FIG. 37).

And, the control unit 7 obtains an access authority in correspondence with the clearance information 9 from the foregoing clearance information 9 and the access authority information 3-i, and controls the access to a data by the access subject on the basis of the obtained access authority (control step; step S3 in FIG. 37).

To enter into the details, the control unit 7 determines the access authority elements (for example, fo11 to fo29 in FIG. 17, FIG. 18) on the condition of the collating clearance information 9A and the authenticating clearance information 9B, and obtains the access authority corresponding to the clearance information 9 through the arithmetic operation that employs the access authority elements.

Figure 35:
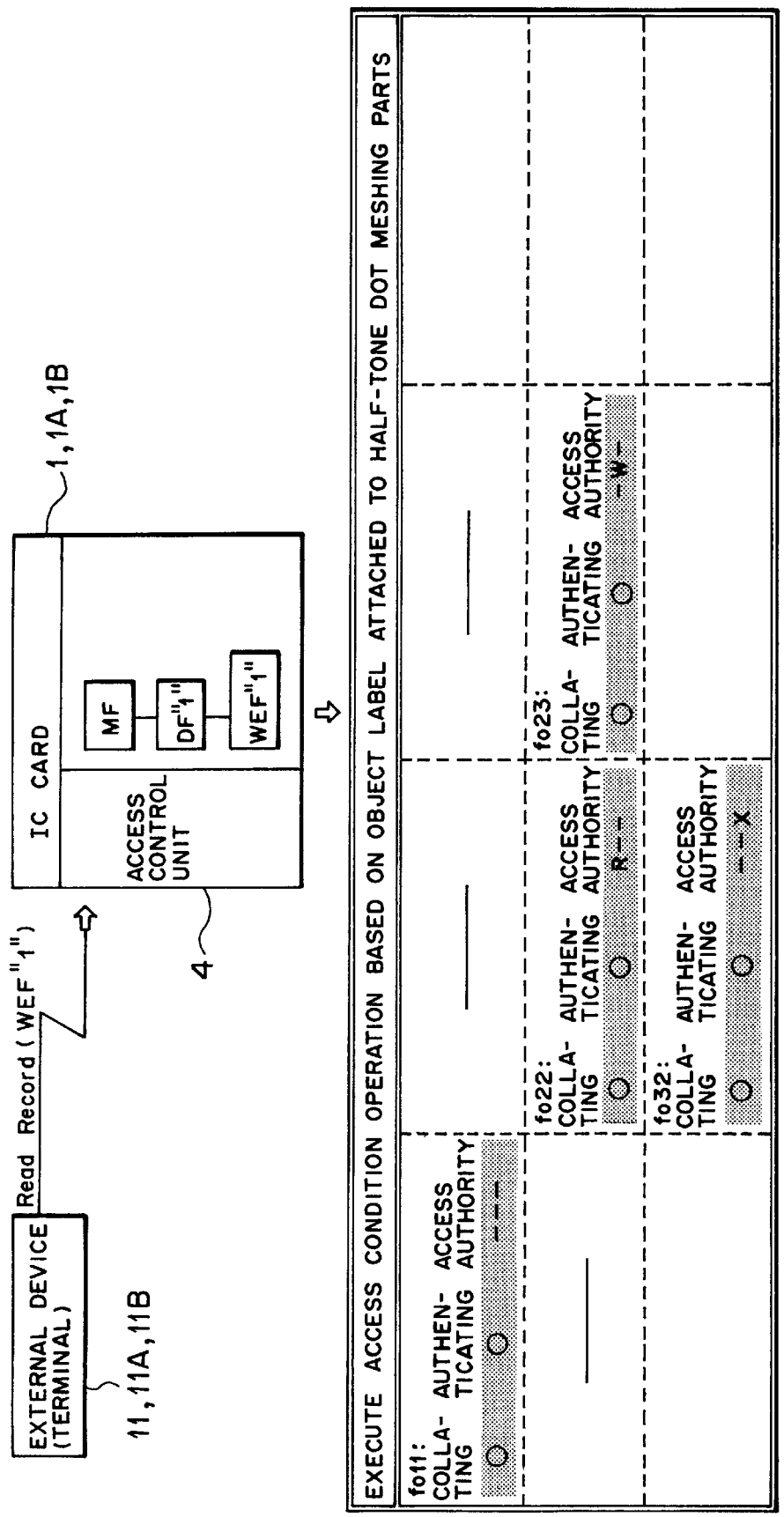
FIG. 35, FIG. 36 each are charts to explain the calculation of an access authority.
Figure 36:
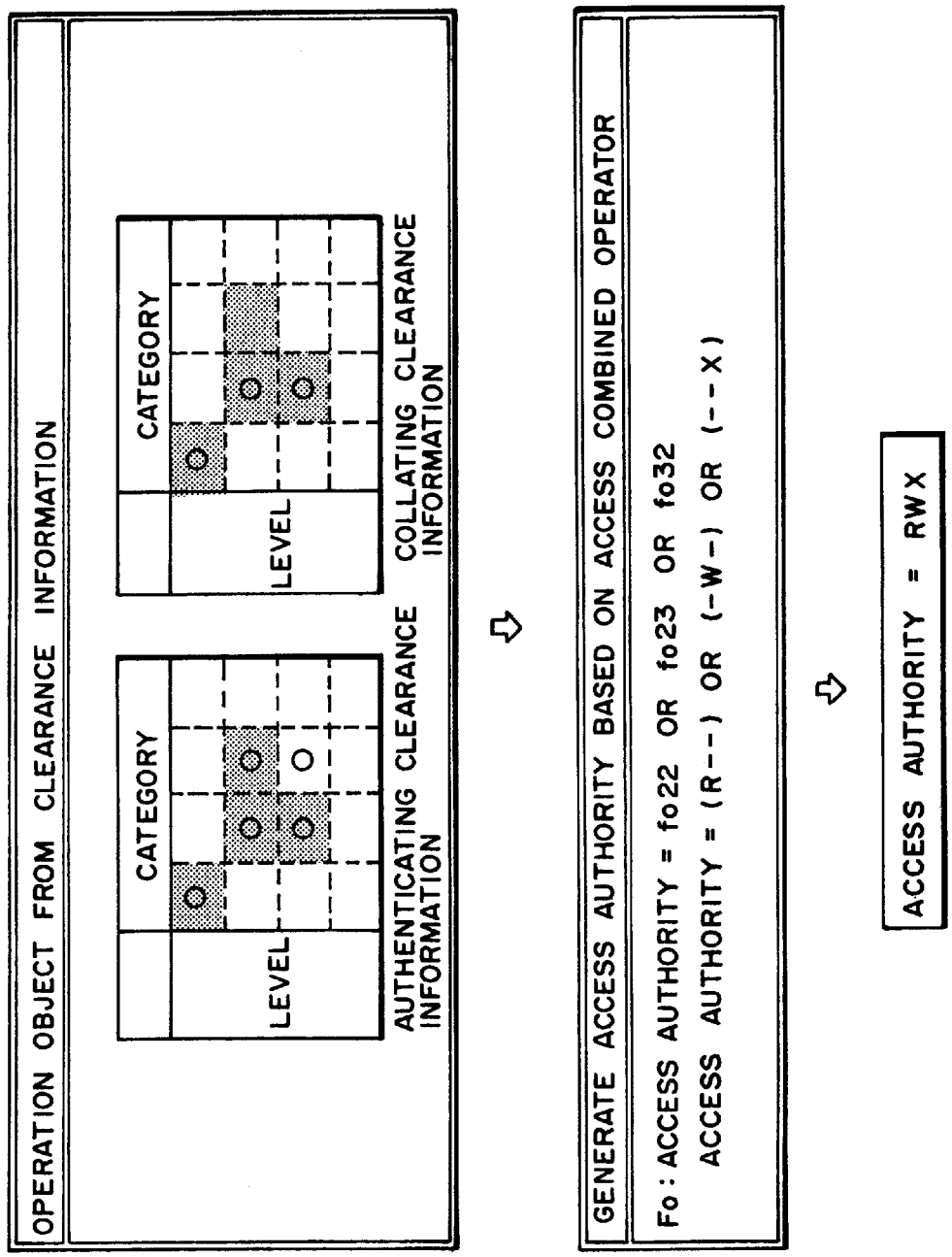

Further, the calculation of the access authority will be described referring to FIG. 35, FIG. 36. As shown in FIG. 35, on the basis of the collating clearance information 9A and the authenticating clearance information 9B generated by the clearance information generating unit 5, the record read is executed in the area of the WEF "1" and the access authority elements are read out. Thereafter, the access authority corresponding to the clearance information 9 is obtained through the arithmetic operation using the access authority elements (see FIG. 36).

Figure 38:
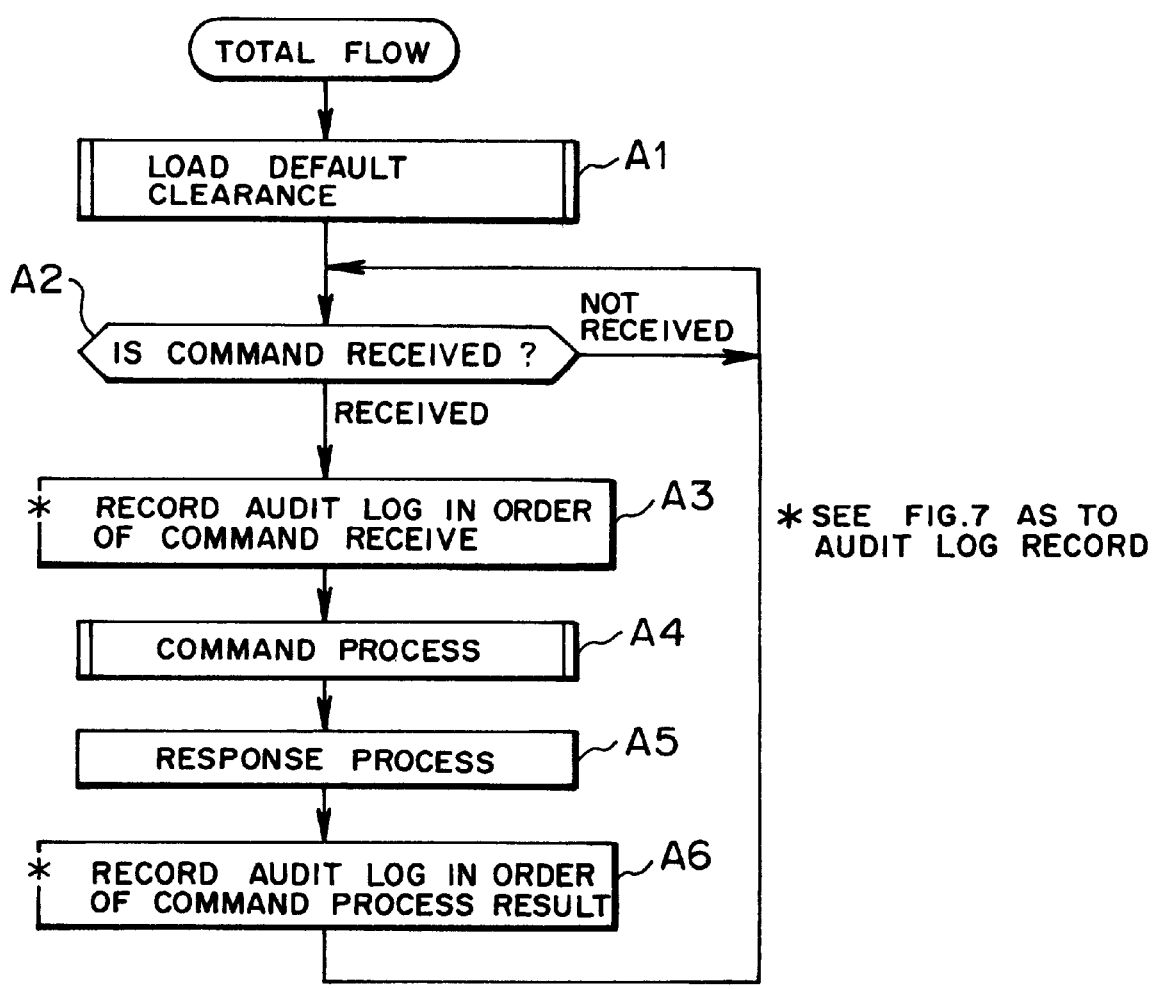
Figure 39:
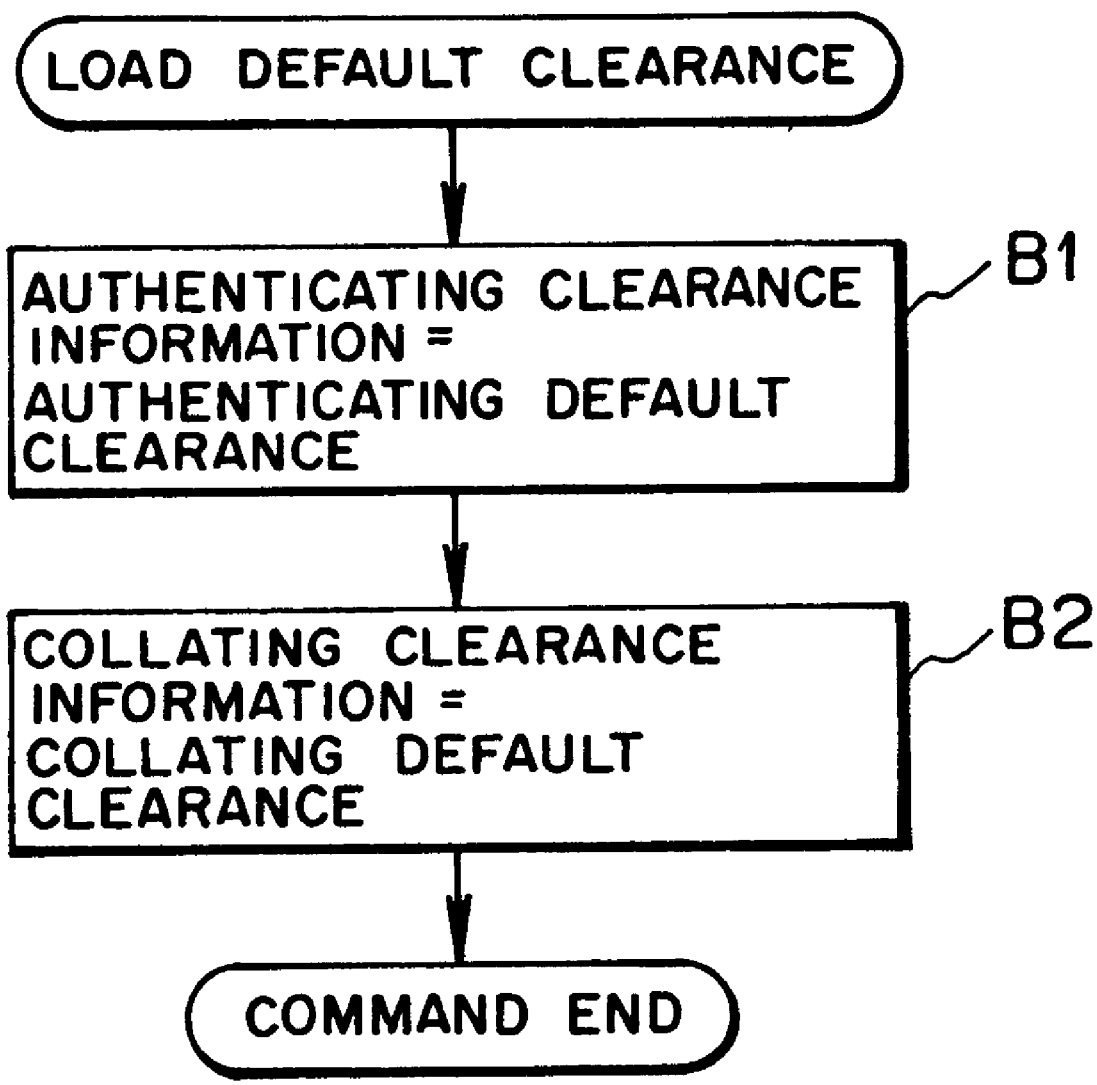
Figure 40:
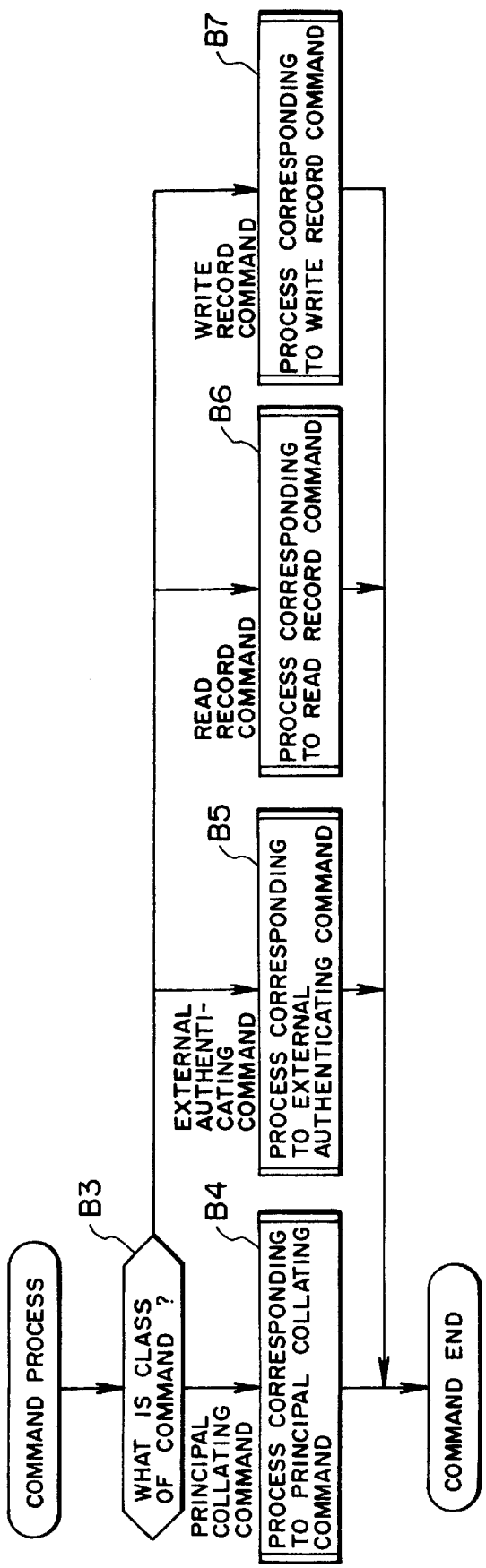
Figure 43:
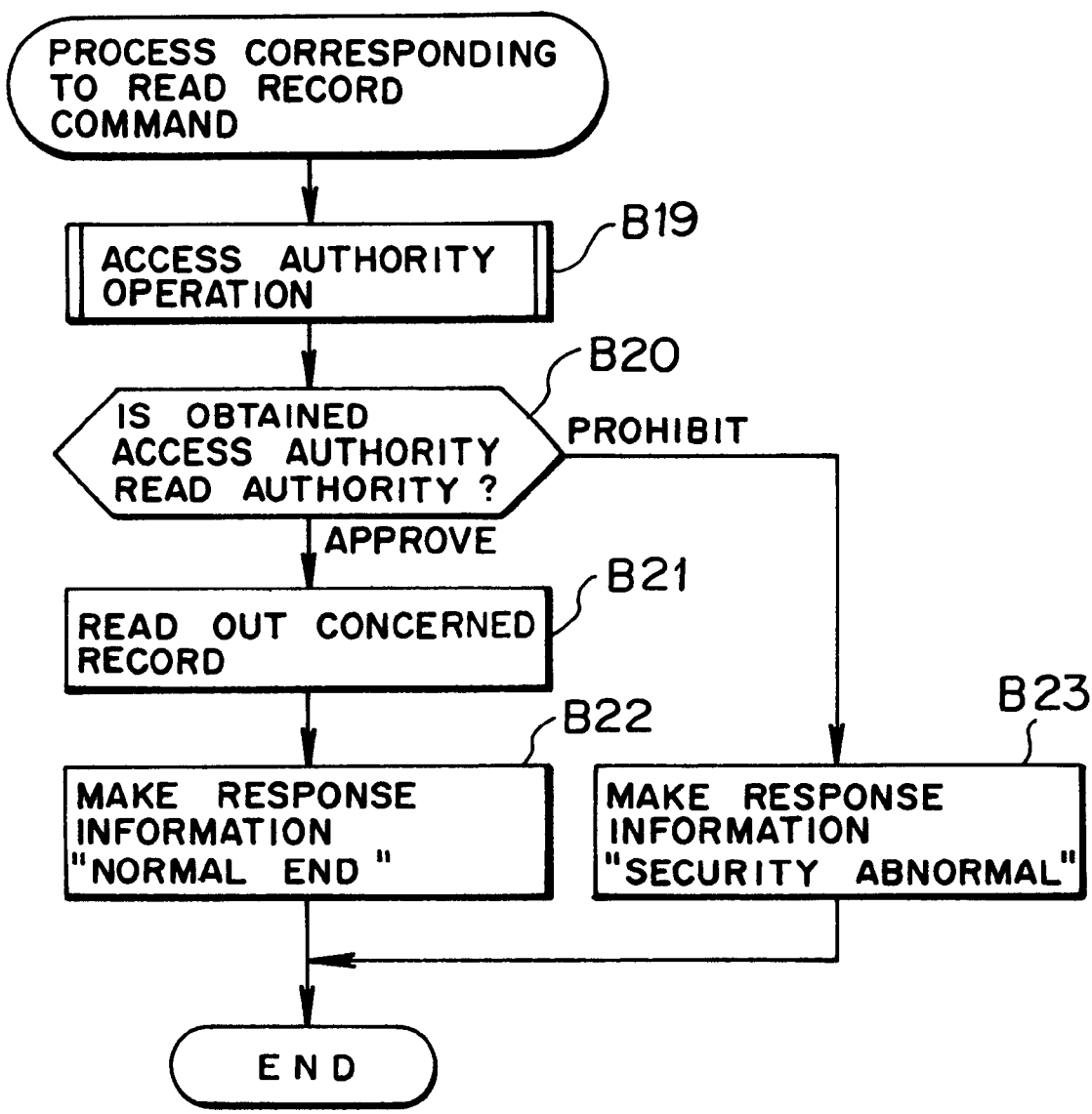
Figure 44:
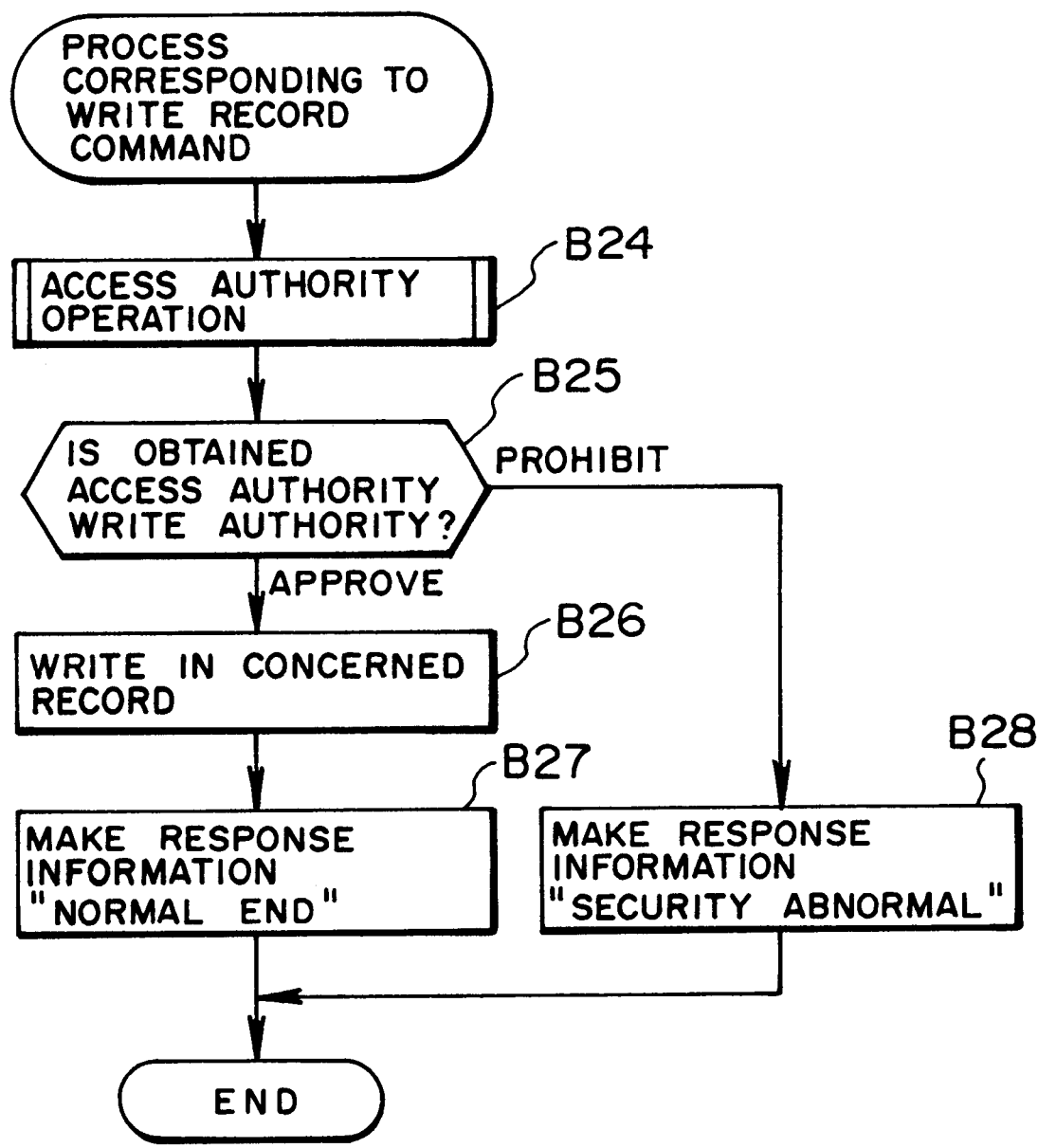
Figure 45:
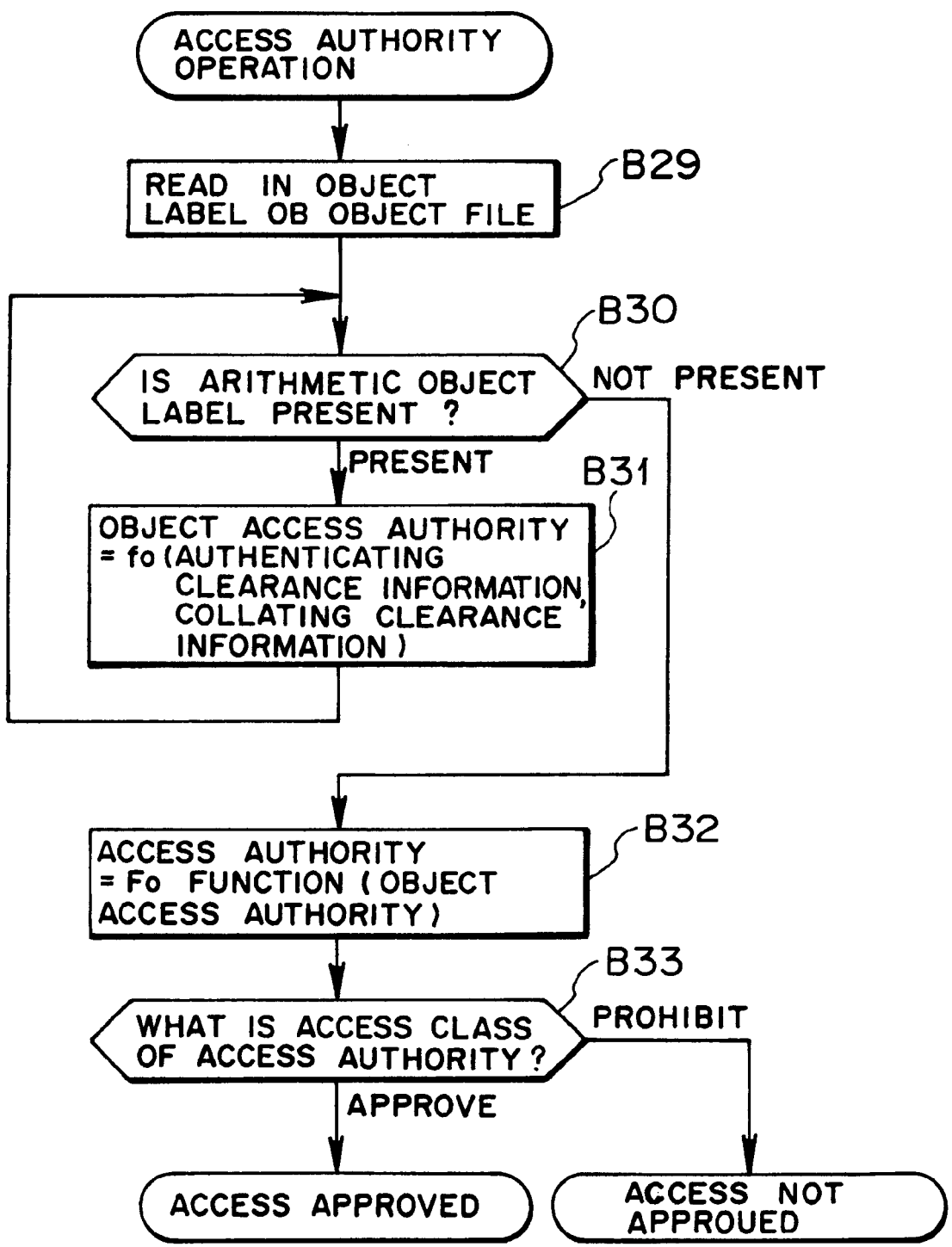
Figure 46A:
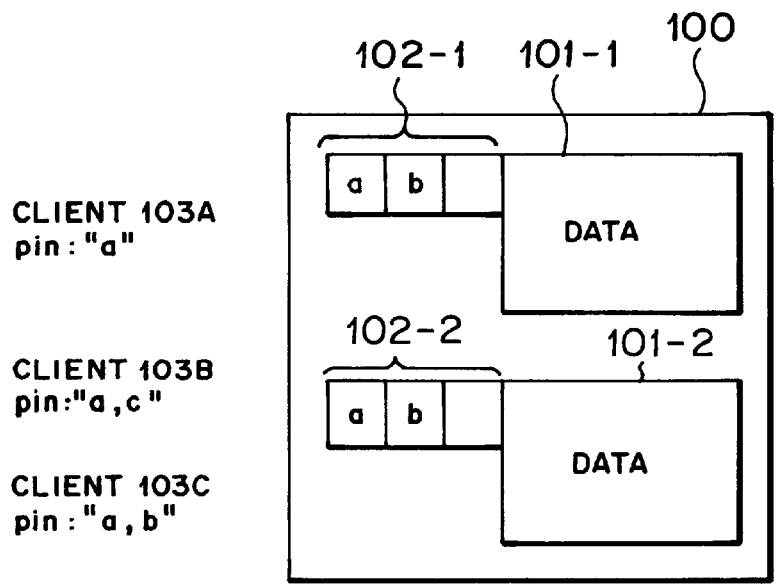
FIG. 46($a$), FIG. 46($b$) each are charts to explain the conventional access control method in the card type recording medium.
Figure 46B:
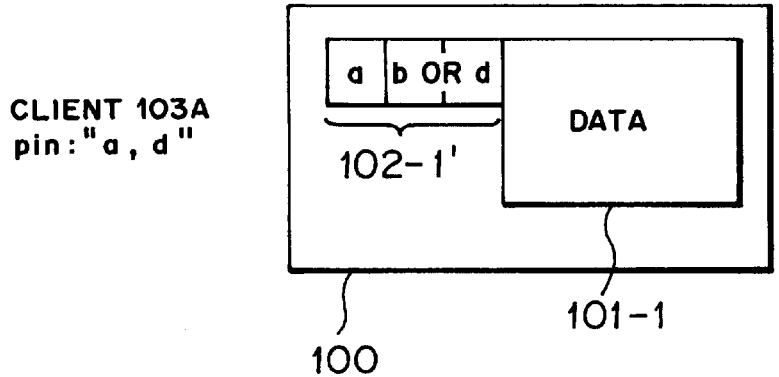
Figure 47:
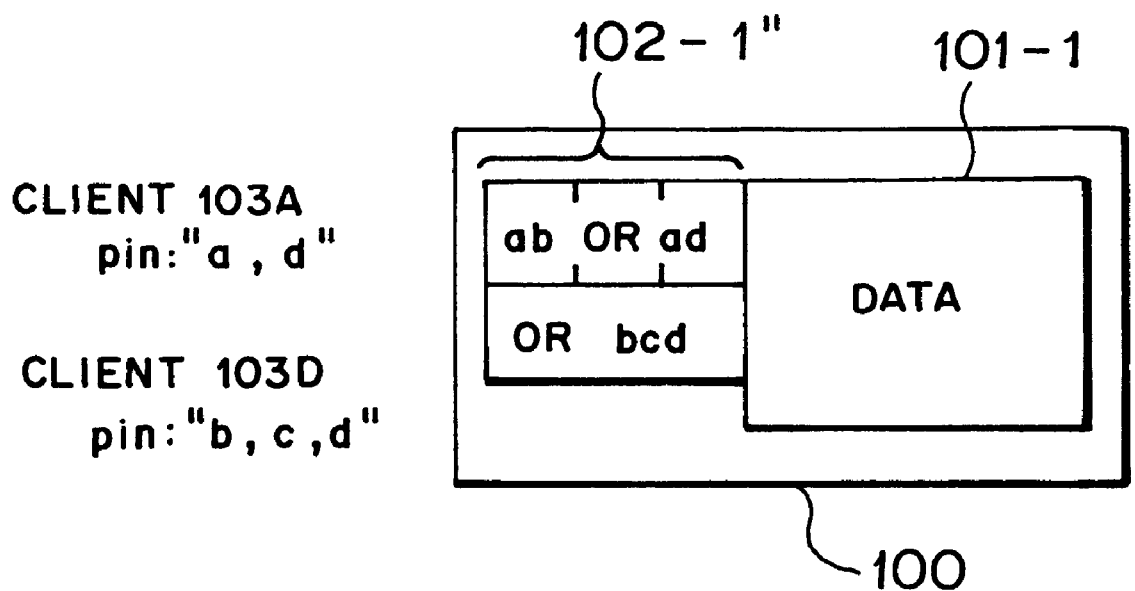
FIG. 47 is a chart to explain the conventional access control method in the card type recording medium.

Further, FIG. 38 through FIG. 45 illustrate the operation of an actual type recording medium 1. FIG. 38 illustrates the total flow of the operation of the card type recording medium 1. Further, FIG. 39 illustrates the details of the step A1 shown in FIG. 38, and FIG. 40 illustrates the details of the step A4 shown in FIG. 38. FIG. 41 through FIG. 44 illustrate the details of the step B4 to step B7 shown in FIG. 40, and FIG. 45 illustrates the details of the step B19 shown in FIG. 43 and the details of the step B24 shown in FIG. 44.

Figure 21B:
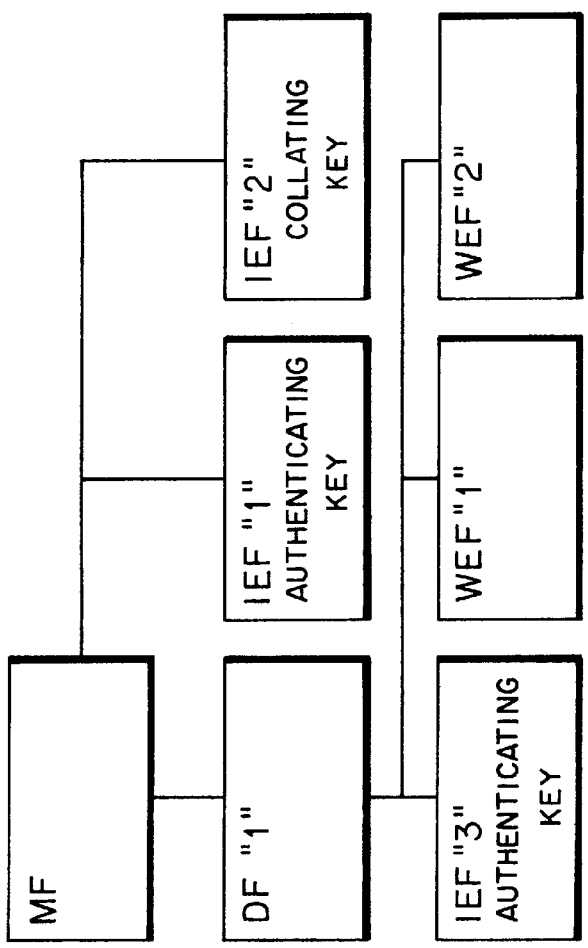
FIG. 21($a$), FIG. 21($b$) each are charts to illustrate a file construction of a nonvolatile memory in an IC card.
Figure 21A:
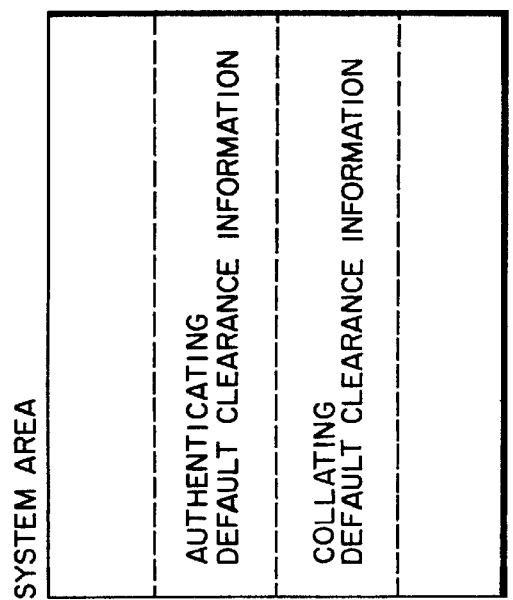

In the access control unit 4 in the card type recording medium 1, first the clearance information generating unit 5 loads an authenticating default clearance information and a collating default clearance information from the foregoing system area [see FIG. 19, FIG. 21(a)], and generates a default clearance information (step A1 in FIG. 38, step B1, B2 in FIG. 39).

Next, the access control unit 4 judges whether the access subject transmits the commands (whether the access control unit 4 receives the commands from the access subject) (step A2 in FIG. 38). If the access control unit 4 does not receive a command, it repeats the operation at the step A2 until it receives a command. And if it receives a command, the access control unit 4 records the audit log 8 (see FIG. 2) in the order that it receives the command (step A3 in FIG. 38).

And, the access control unit 4 executes the processing in relation to the received command (step A4 in FIG. 38). That is, first the access control unit 4 judges the class of the received command (step B3 in FIG. 40), and executes the processing corresponding to the class of the command (steps B4 to B7 in FIG. 40). Namely, if the received command is the principal collating command, the control unit 4 executes the processing corresponding to the principal collating command (step B4 in FIG. 40); if the received command is the external authenticating command, it executes the processing corresponding to the external authenticating command (step B5 in FIG. 40); if the received command is the read record command, it executes the processing corresponding to the read record command (step B6 in FIG. 40); and if the received command is the write record command, it executes the processing corresponding to the write record command (step B7 in FIG. 40).

And, after the control unit 4 executes the processing corresponding to the received command, it responds to the processing (step A5 in FIG. 38), and records the audit log 8 in the order that it processes the command (step A6 in FIG. 38).

Here, the processing corresponding to the principal collating command in the step B4 in FIG. 40 will be described with reference to FIG. 41.

Figure 41:
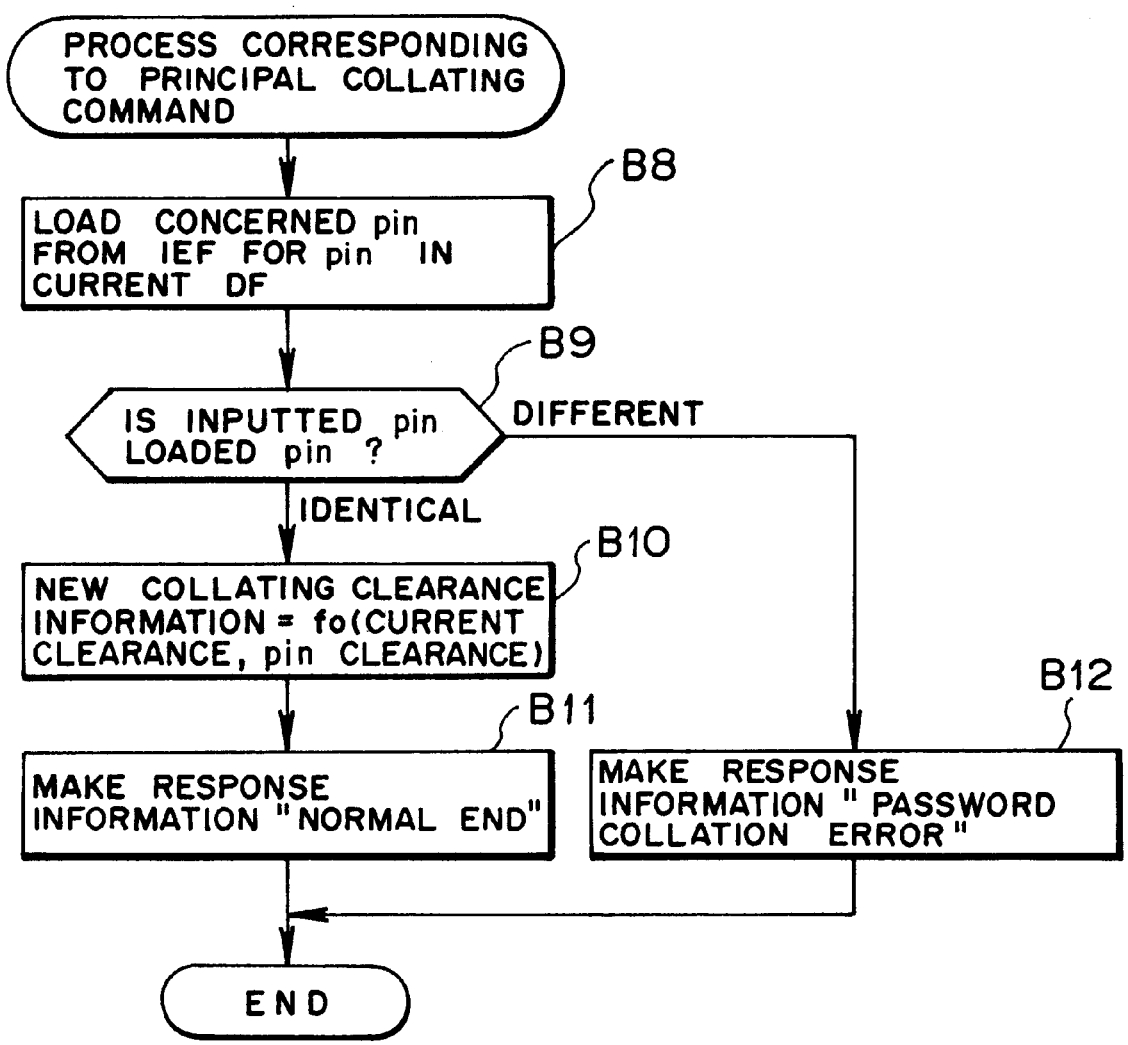

If the received command is the principal collating command, the clearance information generating unit 5 in the access control unit 4 loads the password stored in the IEF for the password (pin) in the current DF in the foregoing data area [see FIG. 19, FIG. 20, FIG. 21(b)] (step B8 in FIG. 41).

And, the clearance information generating unit 5 judges whether the password transmitted together with the principal collating command is identical to the password loaded or not (step B9 in FIG. 41). If the password transmitted is judged identical to the password loaded, the clearance information generating unit 5 generates the collating clearance information 9A (step B10 in FIG. 41), and makes a response information called "normal end" (step B11 in FIG. 41). And, if the password transmitted is judged not identical to the password loaded, the clearance information generating unit 5 makes a response information called "password collation error" (step B12 in FIG. 41).

Further, the processing corresponding to the external authenticating command in the step B5 in FIG. 40 will be described with reference to FIG. 42.

Figure 42:
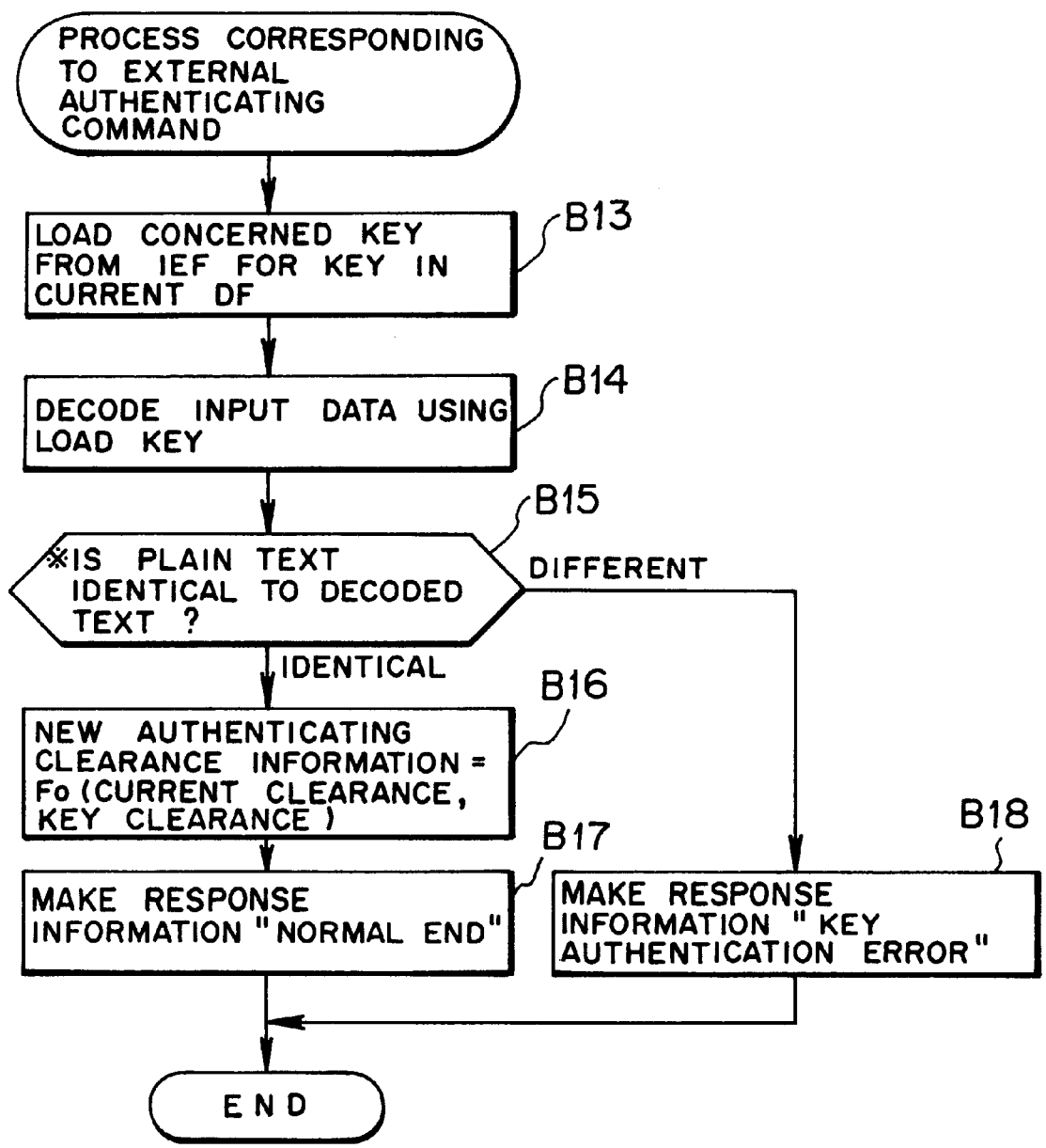

If the received command is the external authenticating command, the clearance information generating unit 5 in the access control unit 4 loads the authenticating key information stored in the IEF for the authenticating key information (key) in the current DF in the foregoing data area [see FIG. 19, FIG. 20, FIG. 21(b)] (step B13 in FIG. 42), and decodes the authenticating key information (input data) transmitted together with the external authenticating command by using the load key (step B14 in FIG. 42).

And, the clearance information generating unit 5 judges whether the loaded authenticating key information (plain text) is identical to the decoded authenticating key information (decoded text) or not (step B15 in FIG. 42). If the plain text is judged identical to the decoded text, the clearance information generating unit 5 generates the authenticating clearance information 9B (step B16 in FIG. 42), and makes a response information called "normal end" (step B17 in FIG. 42). And, if the plain text is judged not identical to the decoded text, the clearance information generating unit 5 makes a response information called "key authentication error" (step B18 in FIG. 42).

Further, the processing corresponding to the read record command in the step B6 in FIG. 40 will be described with reference to FIG. 43.

If the received command is the read record command, the access control unit 4 executes the access control in relation to the access request (read request).

That is, the control unit 7 in the access control unit 4 executes the arithmetic operation of the access authority, on the basis of the collating clearance information 9A, the authenticating clearance information 9B thus generated and the access authority information 3-i corresponding to a data that the access authority information read-in unit 6 reads in, that the access subject requests to access (step B19 in FIG. 43).

And, the access control unit 4 judges whether the obtained access authority is approved of the read authority or not (step B20 in FIG. 43). If the read authority is approved, the access control unit 4 reads out the data (the concerned record) that the access subject requests to access (step B21 in FIG. 43), and makes a response information called "normal end" (step B22 in FIG. 43). And, if the read authority is not approved, the access control unit 4 makes a response information called "security abnormal" (step B23 in FIG. 43).

Further, the processing corresponding to the write record command in the step B7 in FIG. 40 will be described with reference to FIG. 44.

If the received command is the write record command, the access control unit 4 executes the access control in relation to the access request (write request).

That is, the control unit 7 in the access control unit 4 executes the arithmetic operation of the access authority, on the basis of the collating clearance information 9A, the authenticating clearance information 9B thus generated and the access authority information 3-i corresponding to a data that the access authority information read-in unit 6 reads in, that the access subject requests to access (step B24 in FIG. 44).

And, the access control unit 4 judges whether the obtained access authority is approved of the write authority or not (step B25 in FIG. 44). If the write authority is approved, the access control unit 4 writes in the data (the concerned record) that the access subject requests to access (step B26 in FIG. 44), and makes a response information called "normal end" (step B27 in FIG. 44). And, if the write authority is not approved, the access control unit 4 makes a response information called "security abnormal" (step B28 in FIG. 44).

Finally, the arithmetic processing of the access authority in the step B19 in FIG. 43 and the step B24 in FIG. 44 will be described with reference to FIG. 45.

The access authority information read-in unit 6 reads in the access authority information (object label) 3-i corresponding to the data that the access subject requests to access in the control unit 7 of the access control unit 4 (step B29 in FIG. 45), and the control unit 7 judges whether the label information of an arithmetic object is present or not (step B30 in FIG. 45). If the label information of an arithmetic object is present, the control unit 7 obtains the access authority information of the access subject (object) (step B31 in FIG. 45), and repeats the operation at the foregoing step B30. And, if the label information of an arithmetic object is not present, the control unit 7 executes the arithmetic operation of the access authority on the basis of the collating clearance information 9A, the authenticating clearance information 9B, and the access authority information 3-*i*, as mentioned above (step B32 in FIG. 45). The control unit 7 judges the access class of the obtained access authority (step B33 in FIG. 45), and controls to approve or to prohibit the access in correspondence with the access request command (read record command or write record command).

Further, the foregoing clearance information generating step (step S1 in FIG. 37) corresponds to the step A1 shown in FIG. 38 (namely, step B1, B2 shown in FIG. 39), and the step B4, B5 shown in FIG. 40 (namely, step B8 to B12 in FIG. 41, and step B13 to B18 in FIG. 42). And, the foregoing access authority information read-in step (step S2 in FIG. 37) and the control step (step S3 in FIG. 37) correspond to the step B6, B7 shown in FIG. 40 (namely, step B19 to B23 in FIG. 43, step B24 to B28 in FIG. 44, and step B29 to B33 in FIG. 45).

Further, the access control of card type recording medium 1 relating to the embodiment will be described, citing an example in which the personnel and accounting department manager in a corporation accesses the personnel information and the accounting information (see FIG. 3) stored in the file 2-1 and 2-2 inside the card type recording medium 1.

First, the access to the personnel information by the personnel and accounting department manager will be described, dividing the step into (1) through (3) as follows.

(1) Principal Collation

Figures 24, 25:
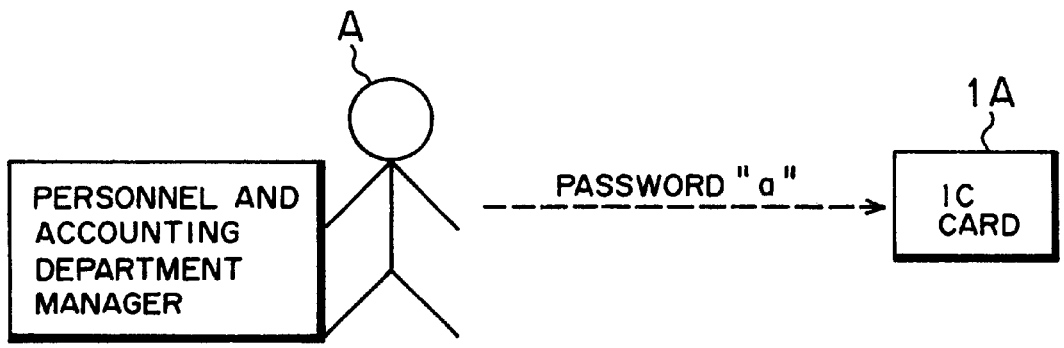
FIG. 24 through FIG. 30 each are charts to explain the operation of the card type recording medium relating to one embodiment of the present invention.

As shown in FIG. 24, when the personnel and accounting department manager A inputs a password "a", using a key board of a terminal not illustrated in FIG. 24, [for example, the terminal 11A as shown in FIG. 8(*a*)], the terminal transmits the password "a" to the IC card 1A, using the principal collating command.

The principal collating command being transmitted, the access control unit (not illustrated in FIG. 24) inside the IC card 1A collates the password "a"; and if it is correctly collated, the access control unit generates the collating clearance information 9A*a*. Further, FIG. 25 illustrates a state in which a clearance information to certify the personnel and accounting department manager is generated.

(2) Authentication of Terminal

Figures 26, 27:
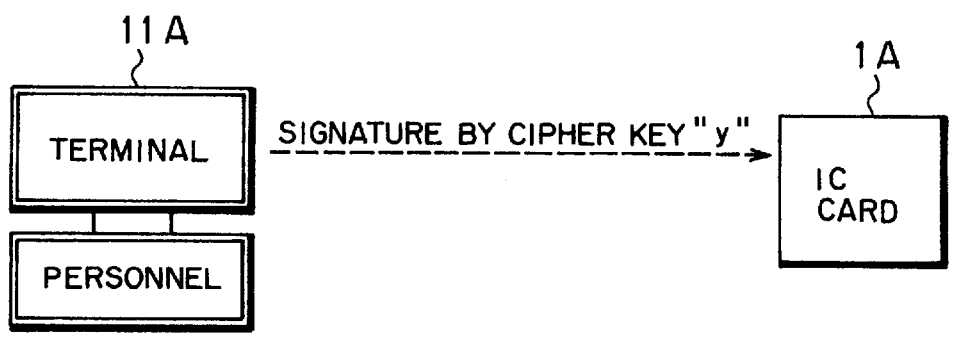

Next, in order to verify that the terminal used in the access is a correct terminal that is authorized to access, the authentication of the terminal (external authentication) is executed, using the external authentication command. In FIG. 26, the terminal 11A transmits an authenticating data accompanied with a signature by a cipher key (cipher key information) "y" to the IC card 1A.

The external authenticating command being transmitted, the access control unit (not illustrated in FIG. 26) inside the IC card 1A judges whether the signed data is correctly decoded, and thereby executes the authentication of the terminal 11A (authentication by cipher key "y"). And, if correctly authenticated, the control unit generates the authenticating clearance information 9B*y*. Further, FIG. 27 illustrates a state in which a clearance information to certify the terminal for the personnel information is generated.

(3) Access to the Personnel Information

The access subject (personnel and accounting department manager A) who possesses the collating clearance information 9A*a* and the authenticating clearance information 9B*y* tries to access the personnel information. The arithmetic operation of the access authority executed by the access control unit when the information is accessed will be explained hereunder.

Figure 28:
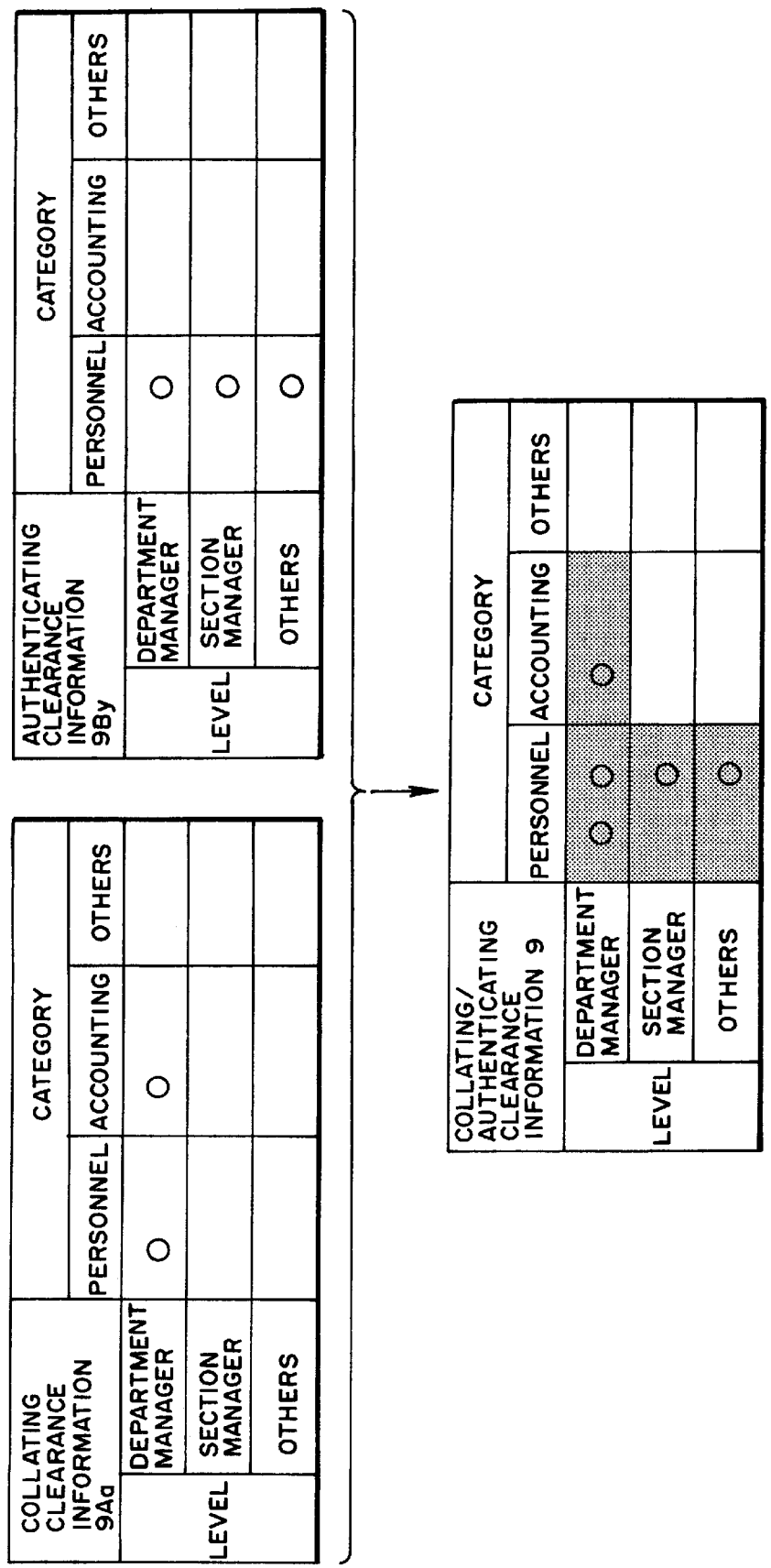

To virtually express to combine the clearance information 9A*a*, 9B*y* obtained in the collation and authentication will lead to FIG. 28.

Figure 29:
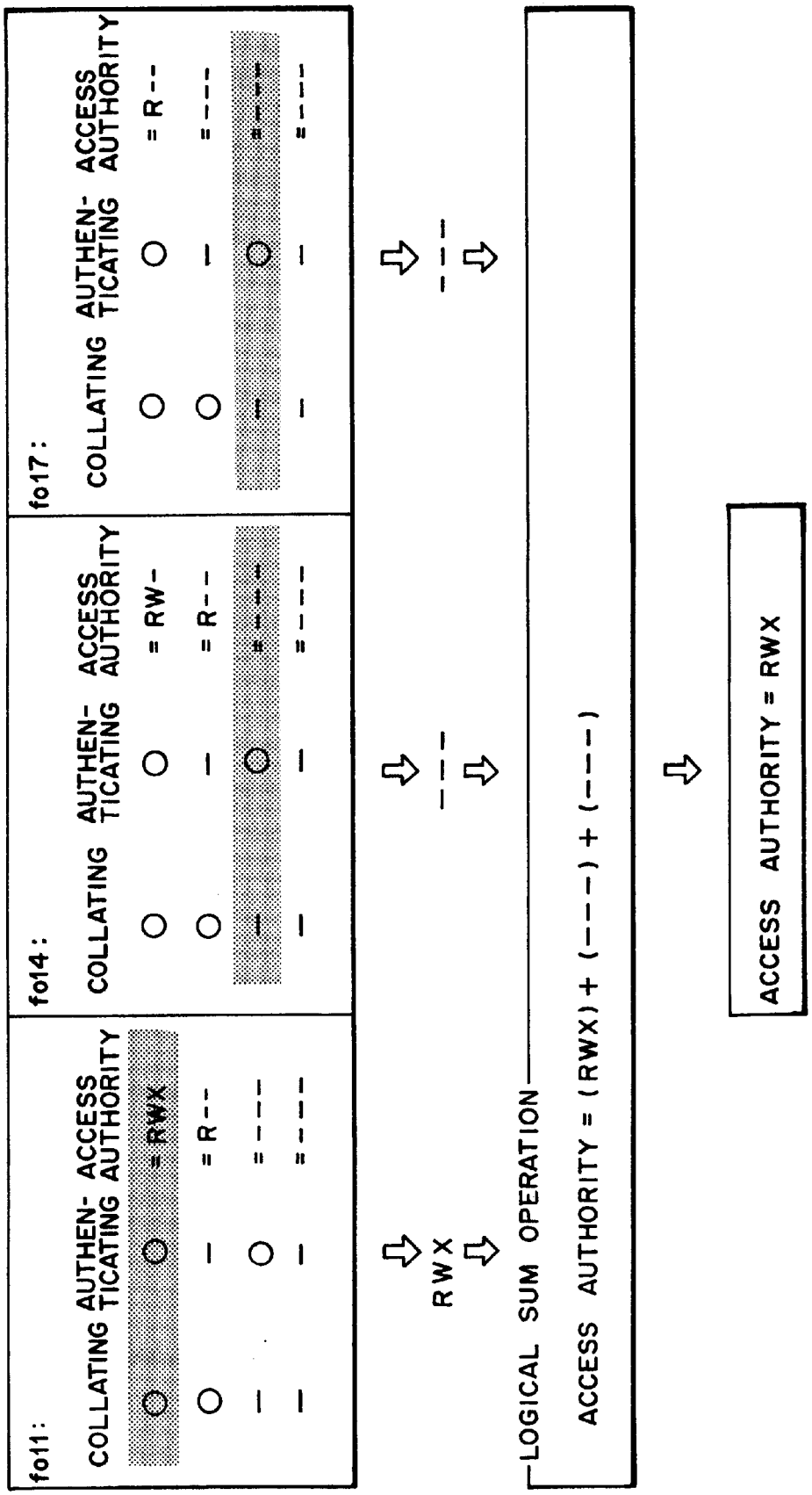

In relation to the clearance information 9A*a*, 9B*y* that the foregoing access subject possesses, the access authority information 3-1 (see FIG. 3) given to the personnel information being the access object has the logical sum operators of the access authority elements fo11, fo14, fo17 as shown in FIG. 29. That is, the access authority is obtained by the following equation (4).

$$\text{Access Authority}=(\text{fo11}) \text{ or } (\text{fo14}) \text{ or } (\text{fo17}) \tag{4}$$

And, on the basis of this arithmetic operation of the access authority, the access control unit approves the access of "RWX" to the access subject (see FIG. 29).

Accordingly, the personnel and accounting department manager is able to access the personnel information stored inside the card type recording medium 1. When the access subject reads in the personnel information, for example, the read process shown in FIG. 4 is correctly performed, and the access subject is able to read in the personnel information.

Next, the access to the accounting information by the personnel and accounting department manager will be described.

Figure 30:
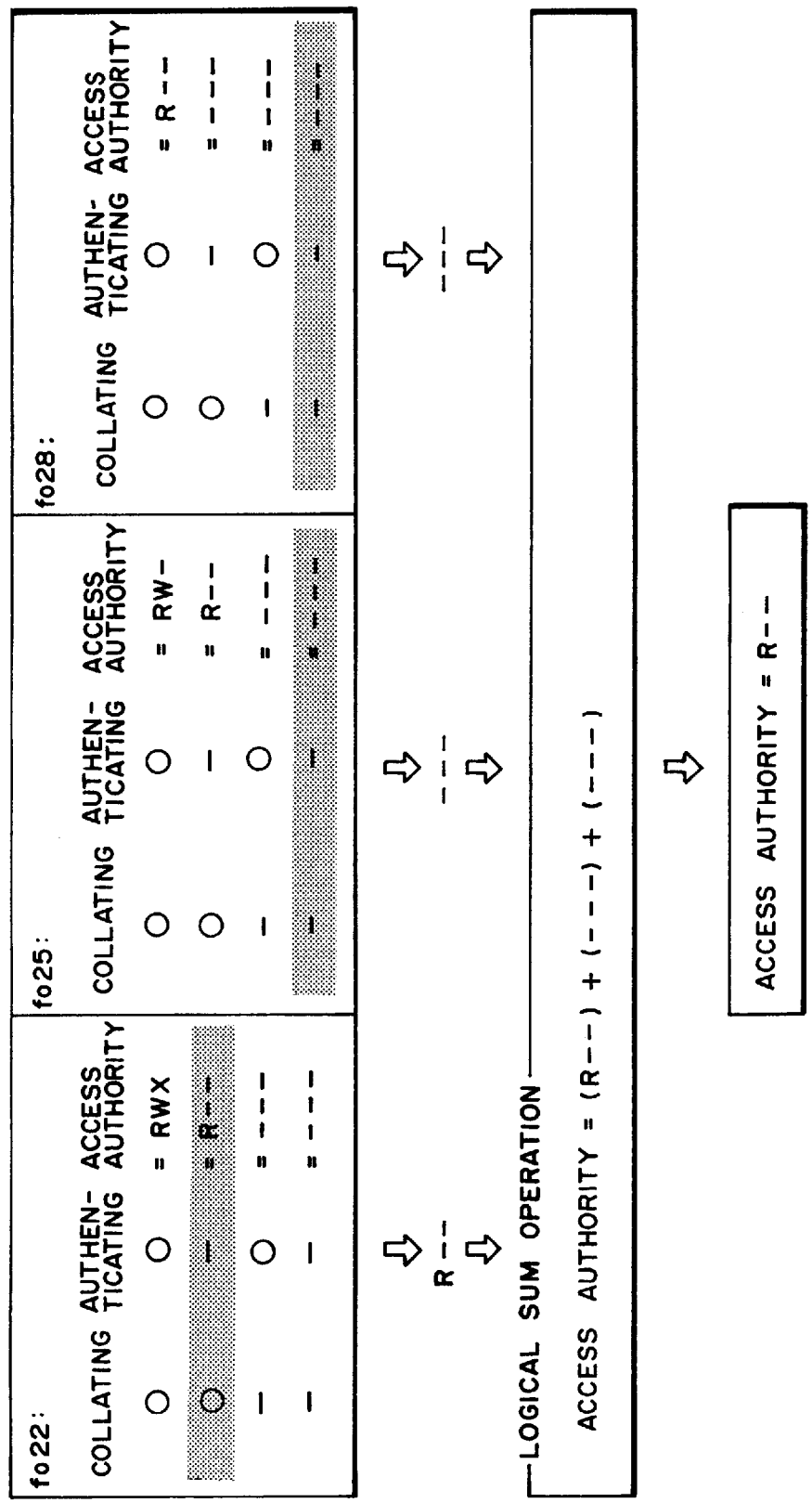

When the access subject obtains the clearance information 9A*a*, 9B*y* as shown in FIG. 28, in the foregoing (1), and tries to access the accounting information, the arithmetic operation of the access authority as shown in FIG. 30 will be performed.

In relation to the clearance information 9A*a*, 9B*y* that the access subject (personnel and accounting department manager) shown in FIG. 28 possesses, the access authority information 3-2 (see FIG. 3) given to the accounting information being the access object has the logical sum operators of the access authority elements fo22, fo25, fo28. That is, the access authority is obtained by the following equation (5).

$$\text{Access Authority}=(\text{fo22}) \text{ or } (\text{fo25}) \text{ or } (\text{fo28}) \tag{5}$$

And, on the basis of this arithmetic operation of the access authority, the access control unit approves the access of "R———" to the access subject (see FIG. 30).

Accordingly, the personnel and accounting department manager is able to access the accounting information stored inside the card type recording medium 1 only for the read-in access. When the access subject reads in the accounting information, for example, the read process shown in FIG. 4 is correctly performed, and the access subject is able to read in the accounting information. However, when the access subject tries to write the accounting information, the access control unit rejects the writing because the access subject does not possess the access authority to write, and informs of the error to the access subject.

Thus, according to the card type recording medium 1 relating to the embodiment of the present invention, since the access control unit 4 is constructed to control an access to a data inside the card type recording medium 1 by the access subject, the setting or modifying work of an access authority is simplified in case of a multi-purpose use, and the management and operation of the security system can reliably be performed.

That is, when performing the setting or modifying an access authority to a data inside the card type recording medium 1, to modify the function for obtaining the access authority in the access authority information 3-*i* given to the data is only needed, and the setting or modifying work of the access authority can be simplified.

And, since the clearance information 9 can be given to each access subject in correspondence to all the access requests from the access subjects, the audit of the security can reliably be performed on the basis of the clearance information 9, which enhances the performance of the security system. Accordingly, the management and operation of the security system can reliably be performed.

Further, to take the multi-purpose use into account, the security system can be designed, only directing the attentions to the relevant clearance information 9 and access authority information 3-*i*, and the independence of a plurality of data can be maintained.

Further, since the arithmetic operation to the clearance information 9 is made possible, the clearance information 9 can be provided for each business purpose. Therefore, when a business is changed from one to another, for example, the clearance information 9 obtained in one business becomes possible of being deleted, which prevents the clearance information 9 from being interfered between businesses. On the contrary, it is possible to set the clearance information 9 to be interfered between businesses.

(b) Others

Figure 6:
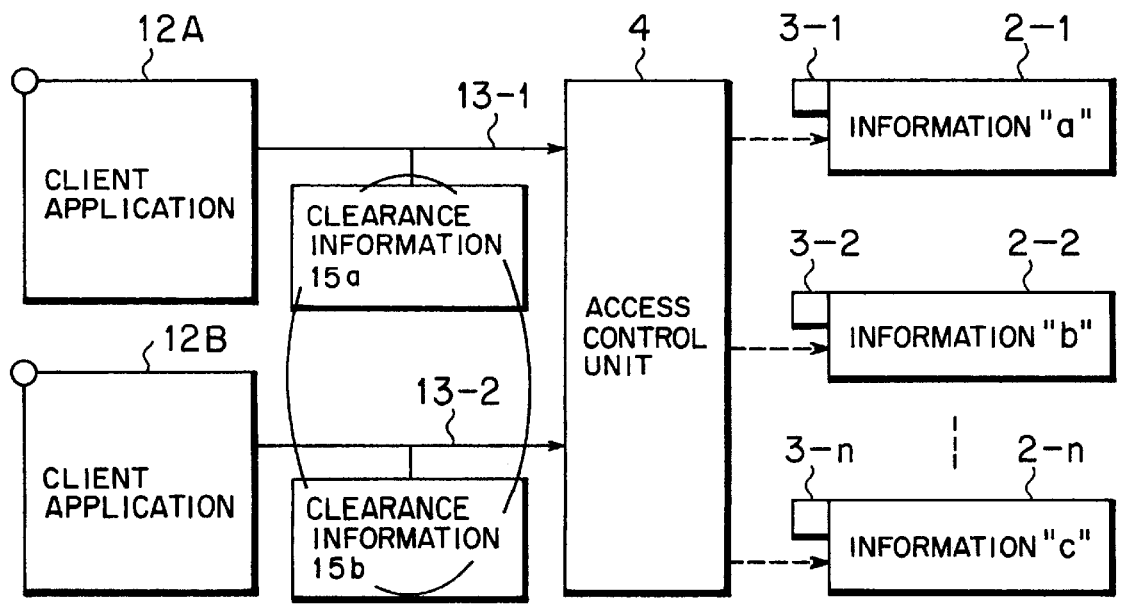
FIG. 6 is a chart to illustrate a state in which a plurality of logic channels are provided between a plurality of client applications and an access control unit.

In the card type recording medium 1 relating to the foregoing embodiment, between the client application 12 and the access control unit 4 is provided only one logic channel 13 through which an access subject accesses a data. However, the invention is not limited to this, and as shown in FIG. 6, a plurality of logic channels 13-1, 13-2 can be provided between a plurality of client applications 12A, 12B and the control unit 4. Further, although not illustrated in the drawing, the plural logic channels 13-1, 13-2 can be provided between one client application and the control unit 4 (which, namely, corresponds to a case that the client applications 12A, 12B shown in FIG. 6 are identical).

In these cases, the access control unit 4 controls the accesses to data by the client applications 12A, 12B independently for each of the logic channels 13-1, 13-2. And, in this case, the access control unit 4 generates a clearance information 15*a* for the logic channel 13-1, and a clearance information 15*b* for the logic channel 13-2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording medium comprising a storage unit to store data being access objects and an access control unit to control an access to said data by an access subject, wherein said access control unit comprises:

an access subject identification information generating unit for generating an access subject identification information which is comprised of a collating access subject identification information for collating an operator and an authenticating access subject identification information for authenticating an application, the collating access subject identification information and the authenticating access subject identification information each being expressed by a matrix of at least one category information and a level information having hierarchies;

an access authority information read-in unit for reading in access authority information which is different from said access subject identification which is different from said access subject identification information for obtaining an access authority set in correspondence with said data that said access subject requests to access, said access authority information is comprised of access authority elements determined on the condition of the collating access subject identification information and the authenticating access subject identification information for each of the elements of said matrix and an arithmetic function using said access authority elements; and a control unit for obtaining an access authority in correspondence with said access subject identification from the access subject identification information and the access authority information, which are not identical with each other, and for controlling an access to said data by said access subject on the basis of said access authority obtained.

2. A recording medium as claimed in claim 1, wherein said access subject identification information is comprised of an information relating to at least two conditions for accessing.

3. A card type recording medium as claimed in claim 1, wherein said collating access subject identification information corresponds to an access subject collating information that indicates a status of the operator, and said authenticating access subject identification information corresponds to an access subject authenticating information for identifying the application.

4. A recording medium as claimed in claim 1, wherein the recording medium comprises a plurality of logic channels through which said access subject accesses said data, and said access control unit controls an access to said data by said access subject independently for each of said logic channels.

5. A recording medium as claimed in claim 4, wherein said access control unit generates said access subject identification information for each of said logic channels.

6. A recording medium as claimed in claim 1, wherein the recording medium holds an audit log being a content in which the operation of said access control unit is audited.

7. A medium as claimed in claim 1, wherein said access subject identification information generating unit holds default collating access subject identification information for collating an operator;

default authenticating access subject identification information for authenticating an application;

access subject collating information for reference for indicating a status of the operator;

access subject authenticating information for reference for identifying the application;

access subject identification information generating information for generating a collating access subject identification information for collating the operator in correspondence with said access subject collating information for reference, and for generating an authenticating access subject identification information for authenticating the application in correspondence with said access subject authenticating information for reference; and an arithmetic function for reflecting generated collating access subject identification information on said default collating access subject identification information, and for reflecting generated authenticating access subject identification information on said default authenticating access subject identification information.

8. An access control method for a recording medium for controlling an access to said data by an access subject in a recording medium comprising storage units to store data being access objects, comprising:

an access subject identification information generating step for generating an access subject identification information which is comprised of a collating access subject identification information for collating an operator and an authenticating access subject identification information for authenticating an application, the collating access subject identification information and the authenticating access subject identification information each being expressed by a matrix of at least one category information and a level information having hierarchies;

an access authority information read-in step for reading in access authority information, which is different from said access subject identification information, for obtaining an access authority set in correspondence with said data that said access subject requests to access, said access authority information is comprised of access authority elements determined on the condition of the collating access subject identification information and the authenticating access subject identification information for each of the elements of said matrix and an arithmetic function using said access authority elements; and a control step for obtaining an access authority in correspondence with said access subject identification information from the access subject identification information and the access authority information, which are not identical with each other, and for controlling an access to said data by said access subject on the basis of said access authority obtained.

9. An access control method for a recording medium as claimed in claim 8, wherein, when the access subject inputs an access subject collating information to indicate a status of an operator and an access subject authenticating information for identifying an application, the access subject identification information generating step compares the inputted access subject collating information and the inputted access subject authenticating information with an access subject collating information for reference and an access subject authenticating information for reference, and if both coincide, the access subject identification information generating step generates a collating access subject identification information for collating the operator and an authenticating access subject identification information for authenticating the application in correspondence with the access subject collating information for reference and the access subject authenticating information for reference, and reflects the generated collating access subject identification information and the generated authenticating access subject identification information on a default collating access subject identification information for collating the operator and a default authenticating access subject identification information for authenticating the application.

10. An access control method for a recording medium as claimed in claim 8, wherein:

said access subject access subject identification information is comprised of a collating access subject identification information for collating an operator and an authenticating access subject identification information for authenticating an application, and said control step determines access authority elements on the condition of the collating access subject identification information and the authenticating access subject identification information, and obtains the access authority in correspondence with said access subject identification information through an arithmetic operation using said access authority elements.

11. A computer-readable recording medium on which an access control program for the recording medium for controlling an access to said data by an access subject through a computer is recorded in a recording medium comprising storage units to store data being access objects, the computer-readable recording medium wherein said access control program for the recording medium causes said computer to function by means of:

an access subject identification information generating unit for generating an access subject identification information which is comprised of a collating access subject identification information for collating an operator and an authenticating access subject identification information for authenticating an application, the collating access subject identification information and the authenticating access subject identification information each being expressed by a matrix of at least one category information and a level information having hierarchies;

an access authority information read-in unit for reading in access authority information, which is different from said access subject identification information, for obtaining an access authority set in correspondence with said data that said access subject requests to access, said access authority information is comprised of access authority elements determined on the condition of the collating access subject identification information and the authenticating access subject identification information for each of the elements of said matrix and an arithmetic function using said access authority elements; and a control unit for obtaining an access authority in correspondence with said access subject identification information and the access authority information, which are not identical with each other, and for controlling an access to said data by said access subject on the basis of said access authority obtained.

12. A recording medium comprising:

a storage unit to store data being access objects and to be provided with an access authority information for obtaining an access authority that is set in correspondence with said storage unit data than an access subject requests to access, and an access control unit to control an access to said data by said access subject, wherein said access control unit comprises:

an access subject identification information generating unit for generating an access subject identification information which is comprised of a collating access subject identification information for collating an operator and an authenticating access subject identification information for authenticating an application, the collating access subject identification information and the authenticating access subject identification information each being expressed by a matrix of at least one category information and a level information having hierarchies;

an access authority information read-in unit for reading in access authority information, which is different from said access subject identification information and is comprised of access authority elements determined on the condition of the collating access subject identification information and the authenticating access subject identification information for each of the elements of said matrix an an arithmetic function using said access authority elements; and a control unit for obtaining said access authority in correspondence with said access subject identification information from the access subject identification information and the access authority information, which are not identical with each other, and for controlling an access to said data by said access subject on the basis of said obtained access authority.

13. A computer-readable recording medium on which an access control program for a recording material is stored, comprising a storage unit to store data being access objects and to be provided with an access authority information for obtaining an access authority that is set in correspondence with said storage unit storing said data that an access subject request to access, for controlling an access to said data by said access subject through a computer to function by means of:

an access subject identification information generating unit for generating an access subject identification information which is comprised of a collating access subject identification information for collating an operator and an authenticating access subject identification information for authenticating an application, the collating access subject identification information and the authenticating access subject identification information each being expressed by a matrix of at least one category information and a level information having hierarchies;

an access authority information read-in unit for reading in access authority information, which is different from said access subject identification information and is comprised of access authority elements determined on the condition of the collating access subject identification information and the authenticating access subject identification information for each of the elements of said matrix and an arithmetic function using said access authority element; and a control unit for obtaining an access authority in correspondence with said access subject identification information from the access subject identification information and the access authority information, which are not identical with each other, and for controlling an access to said data by said access subject on the basis of said obtained access authority.

* * * * *